(12) United States Patent
Ueno et al.

(10) Patent No.: US 11,133,582 B2
(45) Date of Patent: Sep. 28, 2021

(54) ANTENNA MODULE, DISPLAY DEVICE, ANTENNA DRIVING METHOD, CONTROL PROGRAM, AND RECORDING MEDIUM

(71) Applicant: SHARP KABUSHIKI KAISHA, Sakai (JP)

(72) Inventors: Masafumi Ueno, Sakai (JP); Naoki Shiobara, Sakai (JP); Masaaki Moriya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 246 days.

(21) Appl. No.: 16/336,271

(22) PCT Filed: May 8, 2017

(86) PCT No.: PCT/JP2017/017366
§ 371 (c)(1),
(2) Date: Mar. 25, 2019

(87) PCT Pub. No.: WO2018/061282
PCT Pub. Date: Apr. 5, 2018

(65) Prior Publication Data
US 2020/0021023 A1 Jan. 16, 2020

(30) Foreign Application Priority Data
Sep. 27, 2016 (JP) .............................. JP2016-188787

(51) Int. Cl.
*H01Q 3/02* (2006.01)
*H01Q 1/22* (2006.01)
*H04B 5/00* (2006.01)

(52) U.S. Cl.
CPC ............. *H01Q 3/02* (2013.01); *H01Q 1/2258* (2013.01); *H04B 5/0062* (2013.01)

(58) Field of Classification Search
CPC ............. H01Q 3/02; H01Q 1/22; G06F 3/041
See application file for complete search history.

(56) References Cited

U.S. PATENT DOCUMENTS

| | | | | |
|---|---|---|---|---|
| 2013/0271399 | A1* | 10/2013 | Liu | G06F 3/041 345/173 |
| 2014/0087658 | A1* | 3/2014 | Hou | G06F 3/041 455/41.1 |
| 2014/0145982 | A1* | 5/2014 | Peng | G06F 3/04164 345/173 |

(Continued)

FOREIGN PATENT DOCUMENTS

| | | |
|---|---|---|
| JP | 2015-049837 A | 3/2015 |
| JP | 2016-066153 A | 4/2016 |
| WO | 2014/136167 A1 | 9/2014 |

*Primary Examiner* — Hasan Islam
(74) *Attorney, Agent, or Firm* — ScienBiziP, P.C.

(57) ABSTRACT

The present disclosure improves the speed at which communication is started by an antenna that is to carry out communication from among a plurality of antennas for near field communication. An information processing device (10) is provided with a touch panel (120), a plurality of NFC antennas (110), and a control unit (130) for controlling the NFC antennas, and starts driving a drive target antenna which is one or more NFC antennas that correspond to a contact position or proximity position of an object detected by the touch panel, from among the plurality of NFC antennas.

16 Claims, 11 Drawing Sheets

(56) References Cited

U.S. PATENT DOCUMENTS

| | | |
|---|---|---|
| 2016/0004894 A1 | 1/2016 | Tanikawa et al. |
| 2016/0087692 A1 | 3/2016 | Shimomura et al. |
| 2016/0087693 A1 | 3/2016 | Shimomura et al. |
| 2017/0031499 A1* | 2/2017 | Terada .................. G06F 3/0416 |
| 2017/0279198 A1* | 9/2017 | Ikeda ...................... G06F 3/046 |

* cited by examiner

ANTENNA MODULE, DISPLAY DEVICE, ANTENNA DRIVING METHOD, CONTROL PROGRAM, AND RECORDING MEDIUM

TECHNICAL FIELD

The present disclosure relates to an antenna module for carrying out communication, a display device, an antenna driving method, a control program, and a recording medium.

BACKGROUND ART

In recent years, the development of displays having transparent antennas for near field communication (hereinafter, referred to as NFC) housed therein has been advancing.

For example, PTL 1 describes a reader that reads an RFID (radio frequency identification) tag for short range radio communication. The reader is provided with a plurality of antennas, signal lines to each antenna are sequentially switched to thereby drive each antenna, and an antenna that has received a carrier wave transmitted by the RFID tag is detected from among the plurality of antennas.

CITATION LIST

Patent Literature

PTL 1: International Publication No. 2014/136167 (published on Sep. 12, 2014)

SUMMARY OF INVENTION

Technical Problem

However, in the aforementioned prior art, the timing at which the RFID tag is held over the antennas and the timing at which an antenna that receives a carrier wave transmitted by the RFID tag is driven do not always coincide. Therefore, there is a problem in that it takes time from the RFID tag being held over the antennas to a response being made from an antenna that has received a carrier wave transmitted by the RFID tag.

The present disclosure has been devised in consideration of the aforementioned problem, and an objective thereof is to provide a technique for improving the speed at which communication is started by an antenna that is to carry out communication from among a plurality of antennas for near field communication.

Solution to Problem

In order to solve the aforementioned problem, an antenna module according to one aspect of the present disclosure is provided with: a touch panel that detects an object that has been brought into contact or proximity; a plurality of near field communication antennas arranged superposing the touch panel; and a control unit that controls the antennas, in which the control unit starts driving a drive target antenna which is one or more antennas that correspond to a contact position or proximity position of the object detected by the touch panel, from among the plurality of antennas.

In order to solve the aforementioned problem, an antenna driving method according to one aspect of the present disclosure is an antenna driving method in an antenna module provided with: a touch panel that detects an object that has been brought into contact or proximity; a plurality of near field communication antennas arranged superposing the touch panel; and a control unit that controls the antennas, the antenna driving method including a step in which driving is started for a drive target antenna which is one or more antennas that correspond to a contact position or proximity position detected by the touch panel, from among the plurality of antennas.

Advantageous Effects of Invention

According to one aspect of the present disclosure, it is possible to improve the speed at which communication is started by an antenna that is to carry out communication from among a plurality of antennas for near field communication.

DESCRIPTION OF EMBODIMENTS

Embodiment 1

Hereinafter, an embodiment of the present disclosure is as follows when described on the basis of FIGS. 1 to 4.
(NFC Communication System 1)

Figure 1:
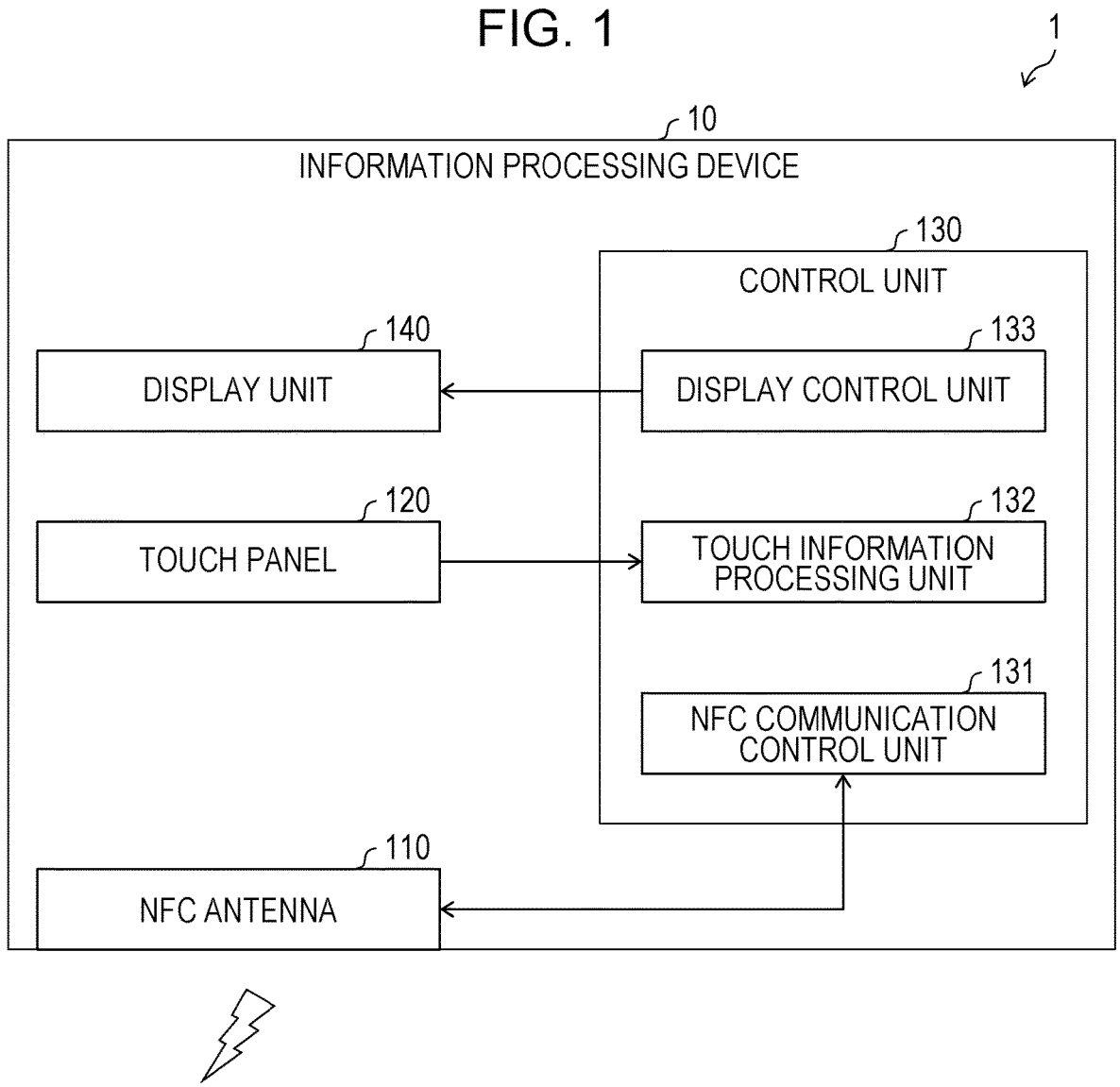
FIG. 1 is a block diagram depicting an example of the main configuration of an NFC communication system according to embodiment 1 of the present disclosure.
Figure 1:
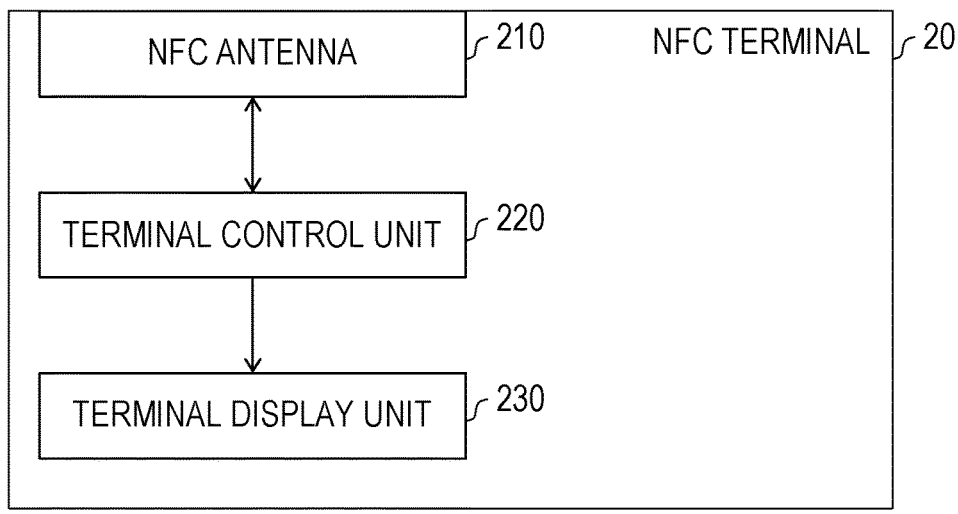

FIG. 1 is a block diagram depicting an example of the main configuration of an NFC (near field communication)

communication system 1 according to the present embodiment. As depicted in FIG. 1, the NFC communication system 1 is constituted by an information processing device 10 (antenna module and display device) and an NFC terminal 20 (terminal device).

The NFC communication system 1 is a system in which the information processing device 10 and the NFC terminal 20 are capable of near field communication by means of the NFC terminal 20 being held over a display surface of the information processing device 10. Specifically, the information processing device 10 first acquires an ID and terminal type of the NFC terminal 20 by means of near field communication. The information processing device 10 then carries out near field communication that corresponds to the acquired information. For example, when having acquired information indicating that the NFC terminal 20 is a terminal that is to carry out payment processing, the information processing device 10 carries out payment processing by way of near field communication with the NFC terminal 20. Furthermore, when having acquired information indicating that the NFC terminal 20 is a smartphone, the information processing device 10 transmits data such as a URL (uniform resource locator) to the NFC terminal 20.

It should be noted that "NFC" represents wireless communication overall in which the reach distance is short, including near field communication or the like using RFID technology such as contactless IC cards or contactless IC tags, for example.

(Information Processing Device 10)

The information processing device 10 is provided with an NFC antenna 110, a touch panel 120, a control unit 130, and a display unit 140, as depicted in FIG. 1.

The NFC antenna 110 is an antenna for carrying out near field communication with the outside. The NFC antenna 110 is provided with an antenna coil for realizing an NFC function. Although not depicted in FIG. 1, the information processing device 10 is provided with a plurality of NFC antennas 110, and therefore, when reference is made simply to the "NFC antenna 110", reference is being made to an arbitrary NFC antenna from among the plurality of NFC antennas or all of the plurality of NFC antennas. Furthermore, when reference is made to an individual NFC antenna 110, expressions such as "NFC antenna 110a" and "NFC antenna 110b" will be used.

The touch panel 120 is constituted by a touch surface that receives the contact of an object, and a touch sensor for detecting contact between a pointing body and the touch surface and an input position according thereto. The touch sensor may be realized as any kind of sensor provided it has the function of being able to detect contact/non-contact between a pointing body and the touch surface. For example, the touch sensor is realized by a pressure sensor, a capacitive sensor, an optical sensor, or the like. When having detected the contact of an object, the touch panel 120 outputs position information that indicates the position where the contact of the object has been detected (for example, coordinates on the touch panel 120). In the present embodiment, a description will be given regarding a case where the touch panel 120 is a configuration that also detects, as contact, the distance between the touch panel 120 and an object being within a prescribed distance without the object being in contact, what is referred to as a proximity state (hover touch). Therefore, in the present embodiment, "contact" means "contact or proximity", and "contact position" means, a "contact position or proximity position".

The control unit 130 is an arithmetic unit that integrally controls each unit of the information processing device 10. The details of the control unit 130 will be described hereinafter.

The display unit 140 is a display device that displays images in a display region. The display unit 140 is an LCD (liquid crystal display), for example, but is not restricted to this example.

(Control Unit 130)

The control unit 130 also functions as an NFC communication control unit 131, a touch information processing unit 132, and a display control unit 133, as depicted in FIG. 1.

The NFC communication control unit 131 has a function as a tag reader that detects an NFC tag by driving the NFC antennas 110 and transmits and receives information. Furthermore, the NFC communication control unit 131 manages the positions where the plurality of NFC antennas 110 are arranged on the touch panel 120. In other words, the NFC communication control unit 131 refers to position information that is output from the touch panel 120, and is thereby able to drive the NFC antenna 110 that corresponds to the position indicated by the position information.

The touch information processing unit 132 refers to the position information that is output from the touch panel 120, and thereby specifies a position where an object is in contact with the touch panel 120. Furthermore, the touch information processing unit 132 specifies the type of contact on the touch panel 120 by referring to the position information. Possible examples of the type of contact are "Touch_IN", "OUT", "STAY", "MOVE", and the like. "Touch_IN" is a change from a state in which contact is not detected to a state in which contact is detected. "OUT" is a change from a state in which contact is detected to a state in which contact is not detected. "STAY" is a continued detection of contact without a change in the position where contact is detected. "MOVE" is the contact position moving while contact is maintained. Furthermore, the touch information processing unit 132 carries out shape analysis, which will be described later, and generates touch information.

The display control unit 133 has a function for controlling the display unit 140 and displaying images in the display region of display unit 140.

Example of External Appearance of NFC Communication System 1

Figure 2:
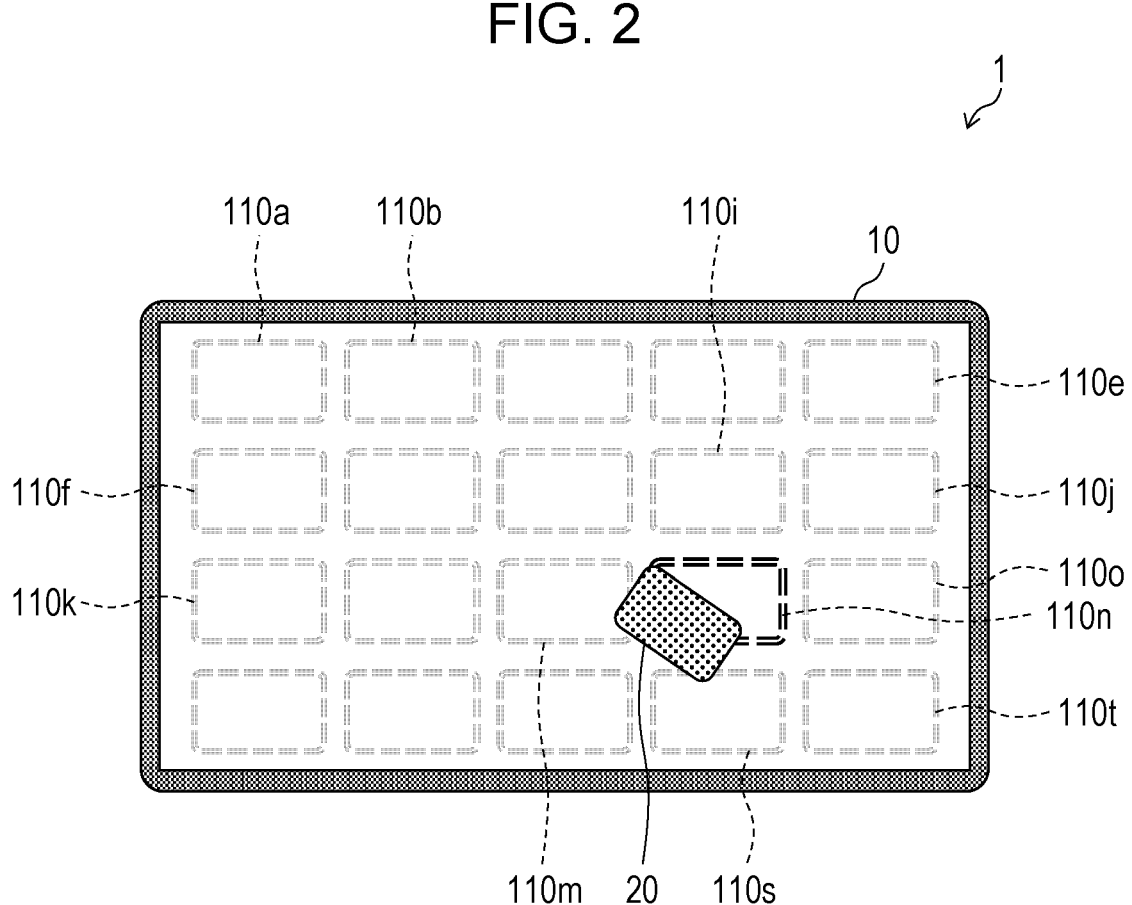
FIG. 2 is a schematic view depicting an example of the external appearance of the NFC communication system according to embodiment 1 of the present disclosure.

FIG. 2 is a schematic view depicting an example of the external appearance of the NFC communication system 1 according to the present embodiment. As depicted in FIG. 2, the plurality of NFC antennas 110 are arranged in the information processing device 10. In the information processing device 10, near field communication with the NFC terminal 20 is carried out by an NFC antenna (NFC antenna 110n in FIG. 2) that is proximate to the NFC terminal 20 and capable of near field communication therewith from among the plurality of NFC antennas 110.

(Configuration Example of Information Processing Device 10)

Figure 3:
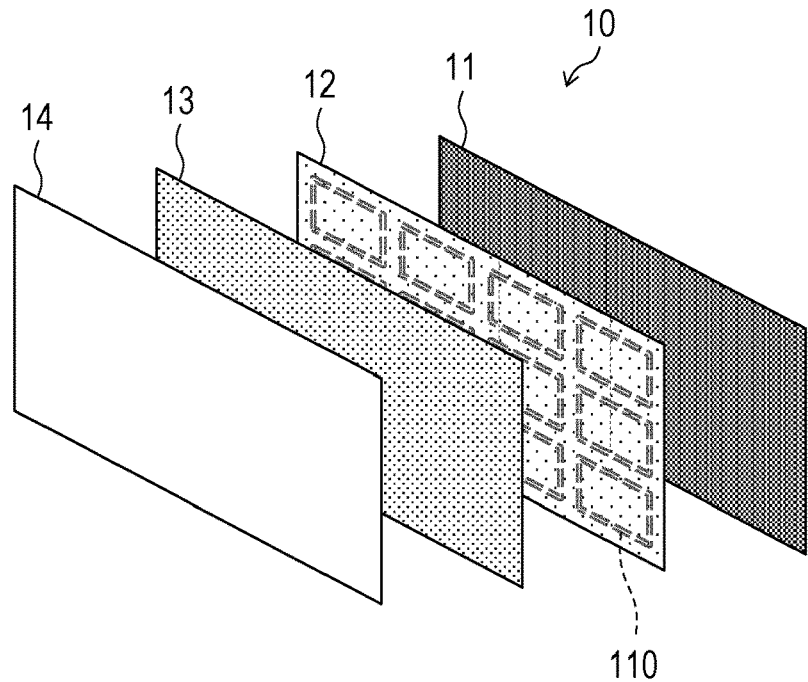
FIG. 3 is a drawing schematically depicting an example of the configuration of an information processing device according to embodiment 1 of the present disclosure.
Figure 3:
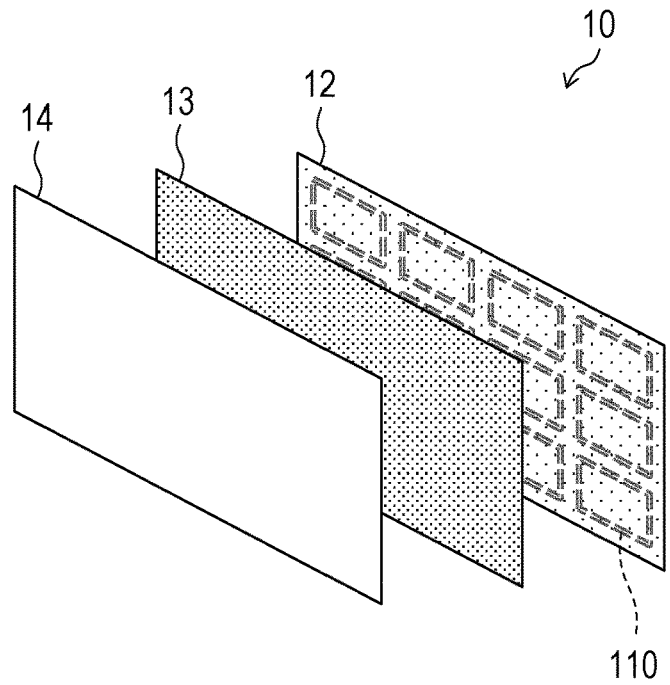

FIG. 3 is a drawing schematically depicting an example of the configuration of the information processing device 10 according to the present embodiment. FIG. 3(a) is a schematic view depicting an example of the configuration of the information processing device 10, and (b) is a schematic view depicting another example of the configuration of the information processing device 10.

The information processing device 10 depicted in FIG. 3(*a*) is provided with a liquid crystal panel module 11, an NFC antenna module 12, a touch panel module 13, and protective glass 14.

The liquid crystal panel module 11 is a module that functions as the display unit 140, and is provided with a liquid crystal panel, a backlight, and the like.

A plurality of transparent NFC antennas 110 are arranged in the NFC antenna module 12. In the schematic view depicted in FIG. 3, a total of 12 NFC antennas 110 are arranged three vertically and four horizontally in a matrix in the NFC antenna module 12, but the quantity and layout are not restricted thereto. Other possible examples of the layout of the NFC antennas 110 are only in the four corners, only at the top, bottom, left, and right edges, and so forth. The liquid crystal panel module 11 is arranged superposing the NFC antenna module 12. Furthermore, the position of the NFC antenna module 12 is not restricted to between the touch panel module 13 and the liquid crystal panel module 11 depicted in FIG. 3(*a*). Furthermore, the NFC antenna module 12 may be provided in the touch panel module 13 (in other words, the touch panel module 13 and the NFC antenna module 12 may be integrated).

The touch panel module 13 is a module that functions as the touch panel 120.

The protective glass 14 protects the touch panel module 13.

Furthermore, as depicted in FIG. 3(*b*), the information processing device 10 may be a configuration that is not provided with the liquid crystal panel module 11. In other words, the information processing device 10 may be a configuration that is not provided with the display unit 110.

(NFC Terminal 20)

The NFC terminal 20 is provided with an NFC antenna 210, a terminal control unit 220, and a terminal display unit 230, as depicted in FIG. 1.

The NFC antenna 210 is an antenna for carrying out near field communication with the outside. The NFC antenna 210 is provided with an antenna coil for realizing an NFC function.

The terminal control unit 220 is an arithmetic unit that integrally controls each unit of the NFC terminal 20.

The terminal display unit 230 is a display device that displays images in a display region. The terminal display unit 230 is an LCD (liquid crystal display), for example, but is not restricted to this example.

It should be noted that the configuration of the NFC terminal 20 is not restricted hereto, and it is sufficient for it to be provided with a function for carrying out near field communication (an NFC function). The NFC terminal 20 is realized as a smartphone mounted with an NFC function or a card mounted with an NFC function, for example.

Furthermore, the shape of the NFC terminal is not particularly restricted. For example, the NFC terminal may have a rectangular shaped contact surface makes contact with the touch panel 120 (specifically, a card mounted with an NFC function depicted in FIG. 2, or the like). Furthermore, the NFC terminal may have a circular shaped contact surface (specifically, a circular card mounted with an NFC function, a figure mounted with an NFC function having a circular stand, or the like). Furthermore, the NFC terminal may be held or fitted to a user. For example, the NFC terminal may be a pen-shaped device that is used by being held by the user, or may be a ring-shaped device that can be fitted onto a finger of the user.

(Flow of Processing Executed by Information Processing Device 10)

Figure 4:
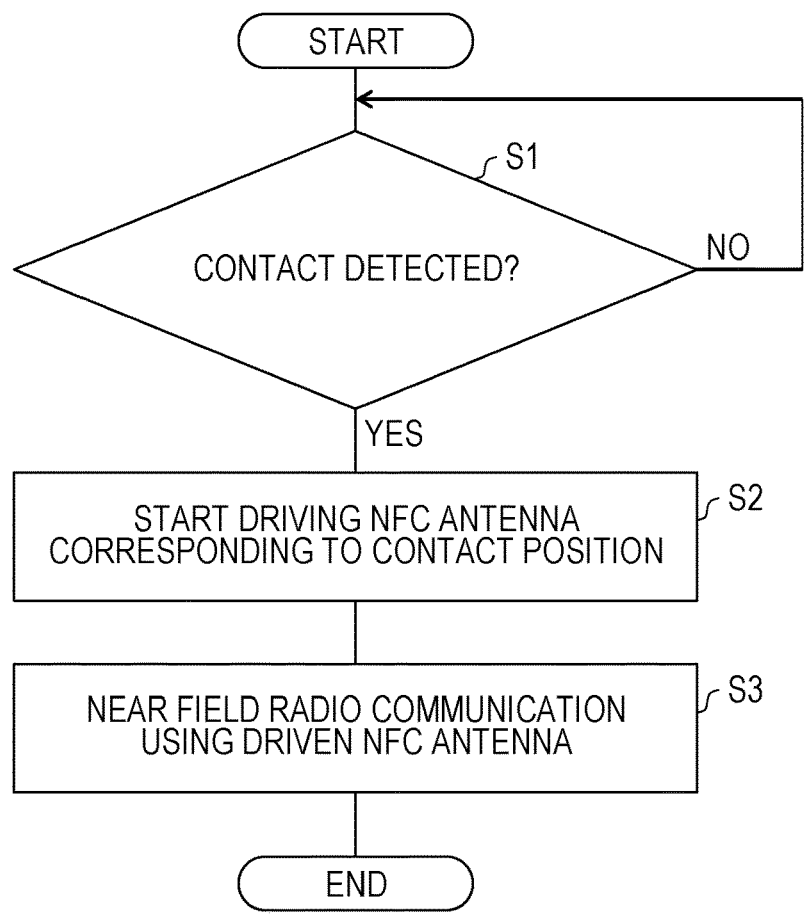
FIG. 4 is a flowchart depicting an example of the flow of processing executed by the information processing device in embodiment 1 of the present disclosure.

FIG. 4 is a flowchart depicting an example of the flow of processing executed by the information processing device 10 in the present embodiment. The processing executed by the information processing device 10 will be described using FIG. 4.

(Step S1)

First, the touch information processing unit 132 refers to the position information that is output from the touch panel 120, and determines whether or not the touch panel 120 has detected the contact of an object.

(Step S2)

In the case of YES in step S1, the NFC communication control unit 131 refers to the position information that is output from the touch panel 120, and starts driving the NFC antenna 110 that corresponds to the contact position of the object.

(Step S3)

The NFC communication control unit 131 carries out near field communication using the NFC antenna 110 that is driven in step S2.

Furthermore, in the case of NO in step S1, the touch information processing unit 132 returns to the processing of step S1 to determine whether or not the touch panel 120 has detected the contact of an object.

In this way, in the NFC communication system 1 according to the present embodiment, the information processing device 10 starts driving the NFC antenna 110 that corresponds to the contact position of the object detected by the touch panel 120, from among the plurality of NFC antennas 110. According to this configuration, the information processing device 10 is able to drive the NFC antenna 110 that is to communicate with the NFC terminal 20 on the basis of the contact position, and is therefore able to improve the speed at which communication is started by the NFC antenna 110 that is to carry out communication. Furthermore, the information processing device 10 does not drive the NFC antennas 110 that are not to carry out communication, and is therefore able to suppress power consumption.

Modified Example 1

In the aforementioned step S1, in a case where the information that is output from the touch panel 120 has been information indicating a region that is wider than a prescribed range, it is preferable for the touch information processing unit 132 to be a configuration that analyzes the shape of the object that has been brought into contact with the touch panel 120. Here, the case where the information that is output from the touch panel 120 has been information indicating a region that is wider than a prescribed range is, in other words, a case where a region in which the touch panel 120 has detected contact is wider than a prescribed range. For example, in the drawing depicted in FIG. 2, the NFC antennas 110 that correspond to the contact position where the NFC terminal 20 is in contact with the touch panel 120 are the NFC antenna 110*m*, the NFC antenna 110*n*, and the NFC antenna 110*s*. In such a case, the touch information processing unit 132 carries out shape analysis for the NFC communication control unit 131 to decide which NFC antenna 110 to start driving from among the three NFC antennas 110. The method by which the touch information processing unit 132 carries out shape analysis will be described using FIG. 5.

Figure 5:
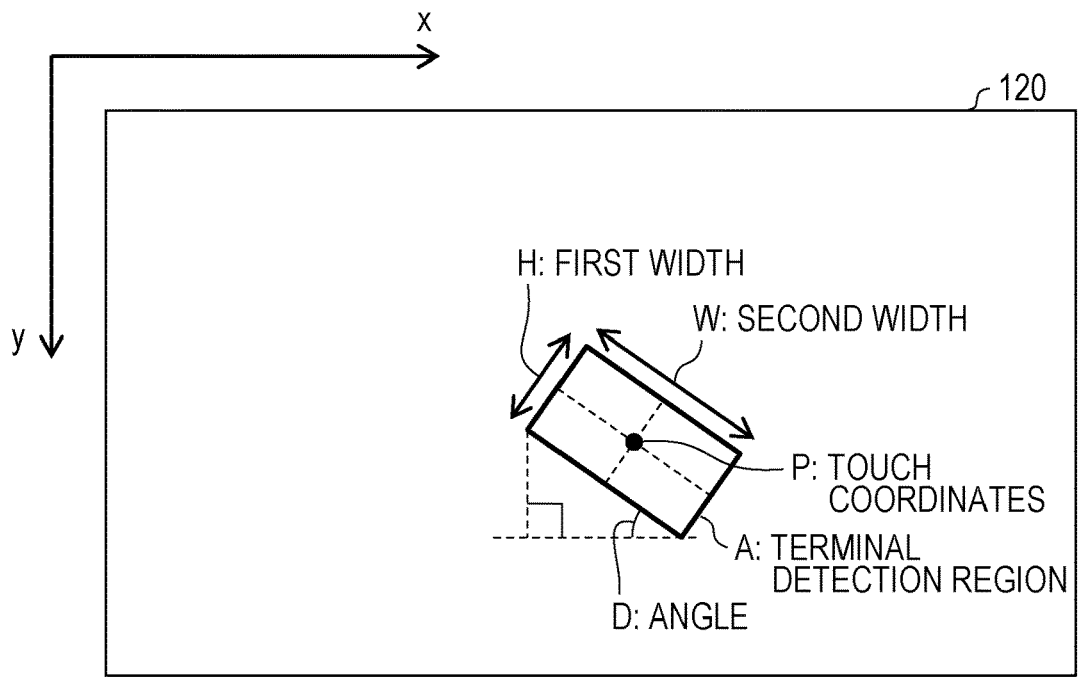
FIG. 5 is a drawing depicting an example of each parameter of a terminal detection region, which is a region specified by means of shape analysis in modified example 1 of the present disclosure.

FIG. 5 is a drawing depicting an example of each parameter of a terminal detection region A, which is a region specified by means of shape analysis in the present modified example. It should be noted that an imaginary XY plane is preset in the touch panel 120 as depicted in FIG. 5.

The touch information processing unit 132 refers to position information that is output by the touch panel 120, and specifies a region where contact has been made with the touch panel 120. Next, the touch information processing unit 132 corrects the outer edges of the region, and thereby specifies the terminal detection region A, as depicted in FIG. 5. The touch information processing unit 132 then specifies the outer peripheral shape of the terminal detection region A depicted in FIG. 5, and calculates the central coordinates (hereinafter, touch coordinates P), size (first width H and second width W), and angle of inclination (angle information, hereinafter, angle D) of the rectangle. In the case of FIG. 5, the touch information processing unit 132 specifies the outer peripheral shape as being a rectangle. It should be noted that the "angle" is an angle formed by the X axis of the aforementioned XY plane and an axis that is coplanar with the X axis and is specified based on the outer peripheral shape of the terminal detection region A (in FIG. 4, a long side of the rectangle).

It should be noted that the information processing device 10 may acquire information on the NFC terminal 20, the shape of the coil of the NFC antenna 210, and the size of the NFC terminal 20, from the NFC terminal 20 via the NFC antenna 110, to shape the outer peripheral shape of the terminal detection region A.

The touch information processing unit 132 generates touch information, which is information in which information indicating the calculated touch coordinates P, size, angle D, and outer peripheral shape of the terminal detection region A are associated. Then, in step S2, the NFC communication control unit 131 refers to the generated touch information, and starts driving the NFC antenna 110 that is nearest the contact position of the NFC terminal 20 (most proximate antenna). A possible example of the NFC antenna 110 that is nearest the contact position of the NFC terminal 20 is the NFC antenna 130 that is nearest the touch coordinates P included in the touch information. Another possible example is the NFC antenna 110 having the largest overlapping area between the analyzed object and an NFC antenna region, which represents the regions in which each NFC antenna 110 is arranged. For example, in the drawing depicted in FIG. 2, the NFC communication control unit 131 starts driving the NFC antenna 110n, which is nearest the contact position of the NFC terminal 20.

In this way, the information processing device 10 starts driving, as a drive target antenna, the NFC antenna 110 that is nearest the contact position of the NFC terminal 20. Therefore, the information processing device 10 is able to improve the speed at which communication is started by the NFC antenna 110 that is to carry out near field communication. Furthermore, the information processing device 10 does not drive the NFC antennas 110 that are not near the contact position of the NFC terminal 20, and is therefore able to suppress power consumption.

Furthermore, the NFC communication control unit 131 may be a configuration that, in addition to driving the NFC antenna 110 that is nearest the contact position of the NFC terminal 20, starts driving one or more antennas that are adjacent to that NFC antenna 110. For example, in the drawing depicted in FIG. 2, the NFC communication control unit 131 may sequentially drive the NFC antenna 110i, the NFC antenna 110m, the NFC antenna 110o, and the NFC antenna 110s in addition to the NFC antenna 110n.

In this way, the information processing device 10 starts driving, as drive target antennas, one or more antennas that are adjacent to the NFC antenna 110 that is nearest the contact position of the NFC terminal 20, in addition to the NFC antenna 110 that is nearest the contact position of the NFC terminal 20. Therefore, the information processing device 10 is able to communicate with the NFC terminal 20 regardless of the arrangement place of the NFC antenna 210 in the NFC terminal 20.

Modified Example 2

Processing of the information processing device 10 in a case where a plurality of NFC terminals 20 have been brought into contact with the touch panel 120 within a prescribed time will be described using FIG. 6.

Figure 6:
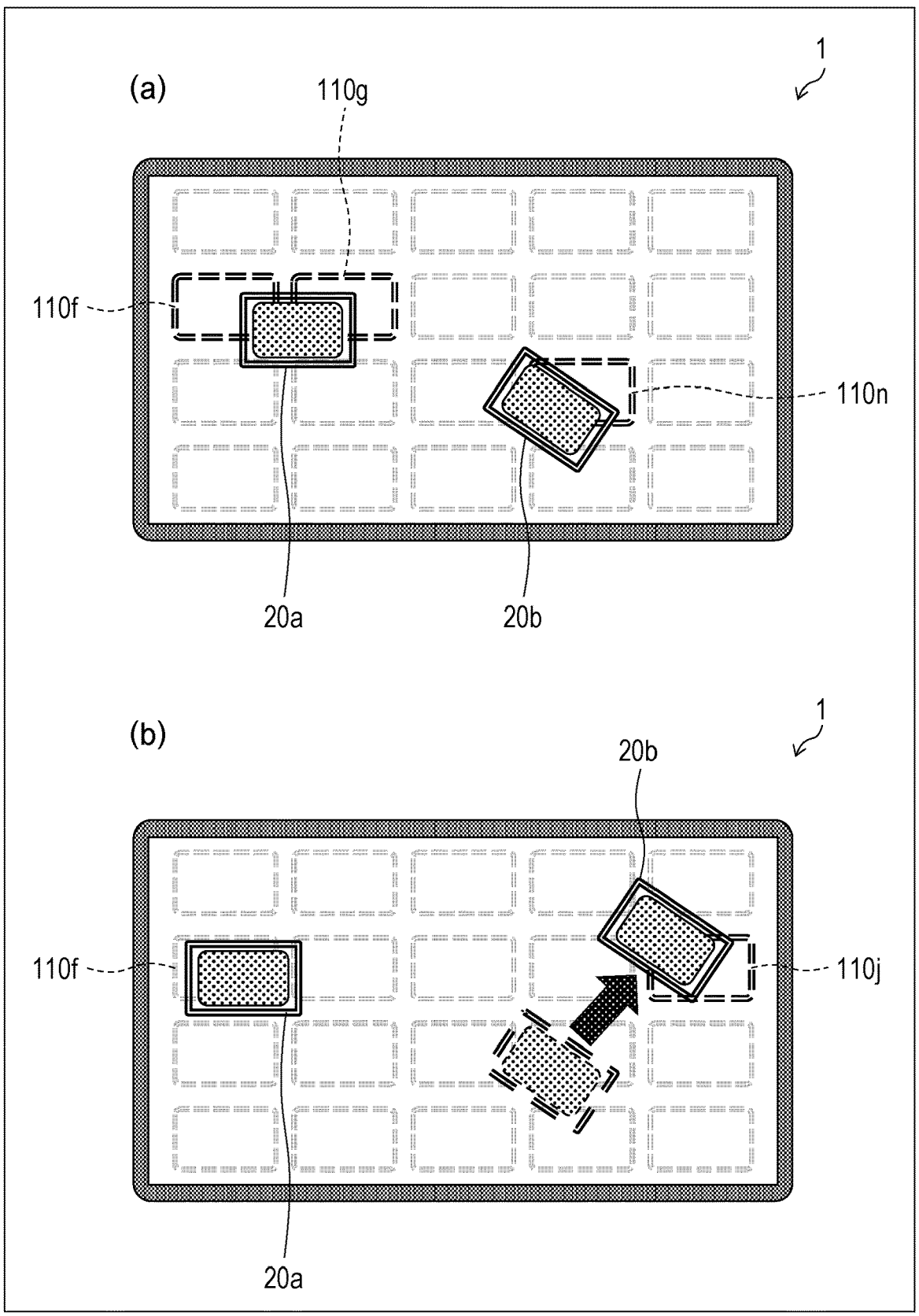
FIG. 6 is a schematic view depicting a case where a plurality of NFC terminals are in contact with a touch panel in modified example 2 of the present disclosure.

FIG. 6 is a schematic view depicting a case where a plurality of NFC terminals 20 are in contact with the touch panel 120 in the present modified example. FIG. 6(a) is a schematic view depicting a case where an NFC terminal 20a and an NFC terminal 20b are in contact with the touch panel 120.

As depicted in FIG. 6(a), in a case where the NFC terminal 20a and the NFC terminal 20b are in contact with the touch panel 120, the touch information processing unit 132 acquires position information indicating the position where the touch panel 120 first detected contact. Next, the NFC communication control unit 131 starts driving one or more NFC antennas 110 that correspond to the position indicated by the position information. For example, in FIG. 6(a), in a case where the touch panel 120 first detected contact by the NFC terminal 20a, the NFC communication control unit 131 drives the NFC antenna 110f and the NFC antenna 110g (first driven antennas) that correspond to the position of contact by the NFC terminal 20a.

Next, after communication processing by the driven NFC antennas 110 has ended, the NFC communication control unit 131 drives one or more NFC antennas 110 that correspond to the position where the touch panel 120 next detected contact. For example, in a case where the touch panel 120 next detected contact by the NFC terminal 20b, the NFC antenna 110n (second driven antenna) that corresponds to the position of contact by the NFC terminal 20b is driven. It should be noted that this driving is carried out by the NFC communication control unit 131 after communication processing by the NFC antenna 110f and the NFC antenna 110g has ended. According to this configuration, the information processing device 10 is able to prevent interference caused by driving a plurality of NFC antennas.

Here, it is preferable for the NFC communication control unit 131 to be a configuration that, after communication processing by the drive target antenna that corresponds to the position where the touch panel 120 first detected contact has ended, stops driving the drive target antenna. According to this configuration, in a case where the NFC communication control unit 131 next drives another NFC antenna 110 as the drive target antenna, the information processing device 10 is able to prevent interference caused by driving a plurality of NFC antennas 110 at the same time. Furthermore, according to this configuration, the information processing device 10 is able to immediately drive the NFC antenna 110 that corresponds to the contact position of the NFC terminal 20 that has been brought into contact with the touch panel 120 thereafter, and is therefore able to improve the speed at which communication is started by the NFC antenna 110 that is to carry out communication.

In addition, it is preferable for the NFC communication control unit 131 to be a configuration that, after communication processing by one or more NFC antennas 110 that correspond to the position where the touch panel 120 first detected contact has ended, stops driving the one or more NFC antennas 110, and once again drives the one or more NFC antennas 110 after a prescribed time has elapsed. According to this configuration, the information processing device 10 is able to once again carry out communication processing appropriately even with respect to an NFC terminal 20 for which communication processing has temporarily ended.

(When the Contact Position Has Moved)

FIG. 6(b) is a schematic view depicting a case where the position of contact by the NFC terminal 20b has moved.

As depicted in FIG. 6(b), in a case where the contact position has moved due to the NFC terminal 20b being moved, the touch information processing unit 132 calculates the distance by which the contact position has moved, with reference to the position information that is output from the touch panel 120. In a case where the distance calculated by the touch information processing unit 132 has been greater than or equal to a prescribed distance, the NFC communication control unit 131 starts driving one or more NFC antennas 110 that correspond to the contact position that has moved.

For example, in the schematic view depicted in FIG. 6(b), in a case where the distance by which the contact position has moved due to the NFC terminal 20b being moved has been greater than or equal to a prescribed distance, the NFC communication control unit 131 starts driving the NFC antenna 110j. According to this configuration, the information processing device 10 is able to alter the drive target antenna in accordance with a change in the contact position.

Furthermore, in a period during which the contact position is moving, the NFC communication control unit 131 may decide to not drive an NFC antenna 110 that corresponds to the contact position that is moving. According to this configuration, the information processing device 10 does not drive an NFC antenna 110 that corresponds to a contact position that is moving, and is therefore able to suppress power consumption.

Furthermore, in a case where the touch information processing unit 132 calculates the speed of the movement of the contact position with reference to the position information that is output from the touch panel 120, and the speed of the movement is less than or equal to a prescribed speed, the NFC communication control unit 131 may start driving an NFC antenna 110 that corresponds to the contact position that is moving. According to this configuration, in a case where the NFC terminal 20 has moved slowly, the information processing device 10 is able to prevent communication with the NFC terminal 20 being interrupted.

Furthermore, the touch information processing unit 132 may specify the locus of the movement of the contact position with reference to the position information that is output from the touch panel 120, estimate the movement direction of the contact position, and calculate a position that corresponds to the estimated movement direction. In this case, the NFC communication control unit 131 starts driving the NFC antenna 110 that corresponds to the calculated position. According to this configuration, the information processing device 10 is able to appropriately select the drive target antenna without driving NFC antennas 110 that are not required.

Furthermore, the NFC communication control unit 131 may restart communication processing by the drive target antenna in a case where an image that is displayed on the display unit 140 has been altered by the display control unit 133. According to this configuration, the information processing device 10 is able to transmit and receive information in accordance with a change in a displayed image.

Modified Example 3

The information processing device 10 may be a configuration that drives the NFC antenna 110 in a case where an object that has been brought into contact with the touch panel 120 is an NFC terminal 20. Specifically, when the touch panel 120 has detected that an object that has been brought into contact has a coil (antenna coil), the control unit 130 determines that the object is an NFC terminal 20. In other words, the control unit 130 also functions as a determination unit that determines whether or not an object that has been brought into contact is an NFC terminal 20. The NFC communication control unit 131 then drives an NFC antenna 110.

The touch panel 120 according to the present modified example is provided with a capacitive sensor as a touch sensor. Thus, the touch panel 120 according to the present modified example is able to detect that an object that has been brought into contact has a coil.

In a case where the touch information processing unit 132 according to the present modified example has acquired a signal indicating that it has been detected that an object that has been brought into contact has a coil, together with position information, from the touch panel 120, the NFC communication control unit 131 according to the present modified example drives the NFC antenna 110 that corresponds to the position indicated by the position information. However, in a case where the touch information processing unit 132 has acquired only position information from the touch panel 120, the NFC communication control unit 131 according to the present modified example does not drive an NFC antenna 130.

Based on the above, the information processing device 10 according to the present modified example is able to distinguish between an object that is provided with a coil (namely, an NFC terminal 20) and an object that is not provided with a coil. Thus, the information processing device 10 is able to drive an NFC antenna 110 only in a case where there is a high possibility of an NFC terminal 20 having been brought into contact. Furthermore, it is possible to accurately detect that an NFC terminal 20 has been brought into contact.

It should be noted that a configuration in which an NFC antenna 110 is driven in a case where an object that has been brought into contact with the touch panel 120 is an NFC terminal 20 is not restricted to a configuration in which it is specified that the object that has been brought into contact with the touch panel 120 has a coil. For example, the information processing device 10 according to the present modified example may be a configuration that drives an NFC antenna 110 in a case where the shape of a contact surface of an object that has been brought into contact with the touch panel 120 is similar to the shape of a contact surface of an NFC terminal 20, which is registered in advance. It should be noted that the details of this configuration will be explained in modified example 4 which is described hereinafter.

Modified Example 3

The information processing device 10 may, on the basis of the shape and position information of an object that has been brought into contact with the touch panel 120, decide whether or not to drive the NFC antenna 110 that corresponds to the position indicated by the position information. Specifically, the information processing device 10 analyzes the shape of the object that has been brought into contact with the touch panel 120, and decides whether or not to drive the NFC antenna 110, on the basis of whether or not the shape of the object is similar to a shape that has been registered in advance. It should be noted that it is sufficient for the information processing device 10 to carry out shape analysis for an object using the method described in modified example 1.

In the present modified example, a description will be given regarding a configuration in which the control unit 130 functions as a finger contact determination unit that determines whether or not the shape of an object that has been brought into contact with the touch panel 120 is a finger of the user. In a case where the control unit 130 in the present modified example has determined that the object is not a finger of the user (in other words, is an object other than a finger), the NFC communication control unit 131 drives the NFC antenna 110.

The touch information processing unit 132 according to the present modified example determines whether or not a specific region that is specified by means of shape analysis is similar to a finger contact region that indicates the contact of a finger of the user. For example, the touch information processing unit 132 may determine whether or not there is a similarity by reading a finger contact region that is stored in an undepicted storage unit, and comparing the shape, size, and the like of the finger contact region and the specific region.

The NFC communication control unit 131 according to the present embodiment decides whether or not to drive an NFC antenna 110, in accordance with the determination result. Specifically, the NFC communication control unit 131 drives the NFC antenna 110 in a case where the determination result indicates that the specific region and the finger contact region are not similar. However, the NFC communication control unit 131 does not drive the NFC antenna 110 in a case where the determination result indicates that the specific region and the finger contact region are similar. Thus, the information processing device 10 does not drive the NFC antenna 110 in a case where communication is not possible with the NFC terminal 20. It is thereby possible to avoid wasteful driving of the NFC antennas 110.

It should be noted that, in the present modified example, a configuration has been described in which the touch information processing unit 132 determines whether or not an object that has been brought into contact with the touch panel 120 is a finger of the user, using the shape analysis described in modified example 1. However, the touch information processing unit 132 according to the present modified example is not restricted to a configuration in which it is possible to carry out the shape analysis described in modified example 1. Specifically, it is sufficient for the touch information processing unit 132 according to the present modified example to be a configuration that is able to distinguish whether an object that has been brought into contact with the touch panel 120 is a finger of the user or a different object.

Furthermore, in the present modified example, an example has been described in which the NFC communication control unit 331 controls the driving of the NFC antennas 110 using a determination result of the touch information processing unit 132; however, the information processing device 10 may use the determination result of the touch information processing unit 132 for other processing.

Furthermore, the NFC communication control unit 131 of the present modified example was a configuration that drives an NFC antenna 110 in a case where the determination result does not indicate that the specific region and the finger contact region are similar; however, driving control of the NFC antenna 110 based on the determination result is not restricted to this example. For example, the NFC communication control unit 131 may be a configuration that drives the NFC antenna 110 in a case where the determination result indicates that the specific region and the finger contact region are similar. Thus, for example, in an application that transitions to a screen for carrying out near field communication due to a menu displayed on the display unit 140 being selected with a touch operation, an NFC antenna 110 can be activated with a touch operation performed by a finger of the user serving as a trigger. Power consumption can thereby be suppressed. Furthermore, for example, in a case where the NFC terminal 20 is a ring-shaped device that can be fitted onto a finger of the user, near field communication can be carried out merely by the user performing a touch operation with a finger.

Furthermore, the information processing device 10 may be a configuration that stores a terminal contact region that indicates contact of the NFC terminal 20 in a storage unit. Thus, the touch information processing unit 132 determines whether or not the specific region and the terminal contact region are similar by comparing the specific region and the terminal contact region. The NFC communication control unit 131 drives an NFC antenna 110 in a case where the determination result indicates that the specific region and the terminal contact region are similar. However, the NFC communication control unit 131 does not drive an NFC antenna 110 in a case where the determination result indicates that the specific region and the terminal contact region are not similar. Thus, the information processing device 10 is able to drive an NFC antenna 110 only in a case where there is a high possibility of an NFC terminal 20 having been brought into contact. Furthermore, it is possible to accurately detect that an NFC terminal 20 has been brought into contact.

It should be noted that the configurations of the aforementioned modified examples 3 and 4 can also be applied to the embodiments described hereinafter.

Embodiment 2

Another embodiment of the present disclosure is as follows when described on the basis of FIGS. 7 and 8. It should be noted that, for convenience of the description, members having the same functions as the members described in the aforementioned embodiment are denoted by the same reference signs and descriptions thereof are omitted.

In the NFC communication system 1 in the aforementioned embodiment, the touch panel 120 was a configuration that also detects a proximity state in addition to the contact of an object; however, in the present embodiment, a description will be given regarding a case where the touch panel 120 is not able to detect the proximity of an object.

(NFC Communication System 1a)

An NFC communication system 1a is constituted by an information processing device 10a and an NFC terminal 20. The information processing device 10a is provided with a control unit 130a instead of the control unit 130 in the aforementioned information processing device 10. The control unit 130a functions as an NFC communication control unit 131a instead of the NFC communication control unit 131 in the aforementioned control unit 130. The NFC communication control unit 131a carries out scan driving in which the NFC antennas 110 are sequentially driven in a prescribed order.

Example of External Appearance of NFC Communication System 1a

Figure 7:
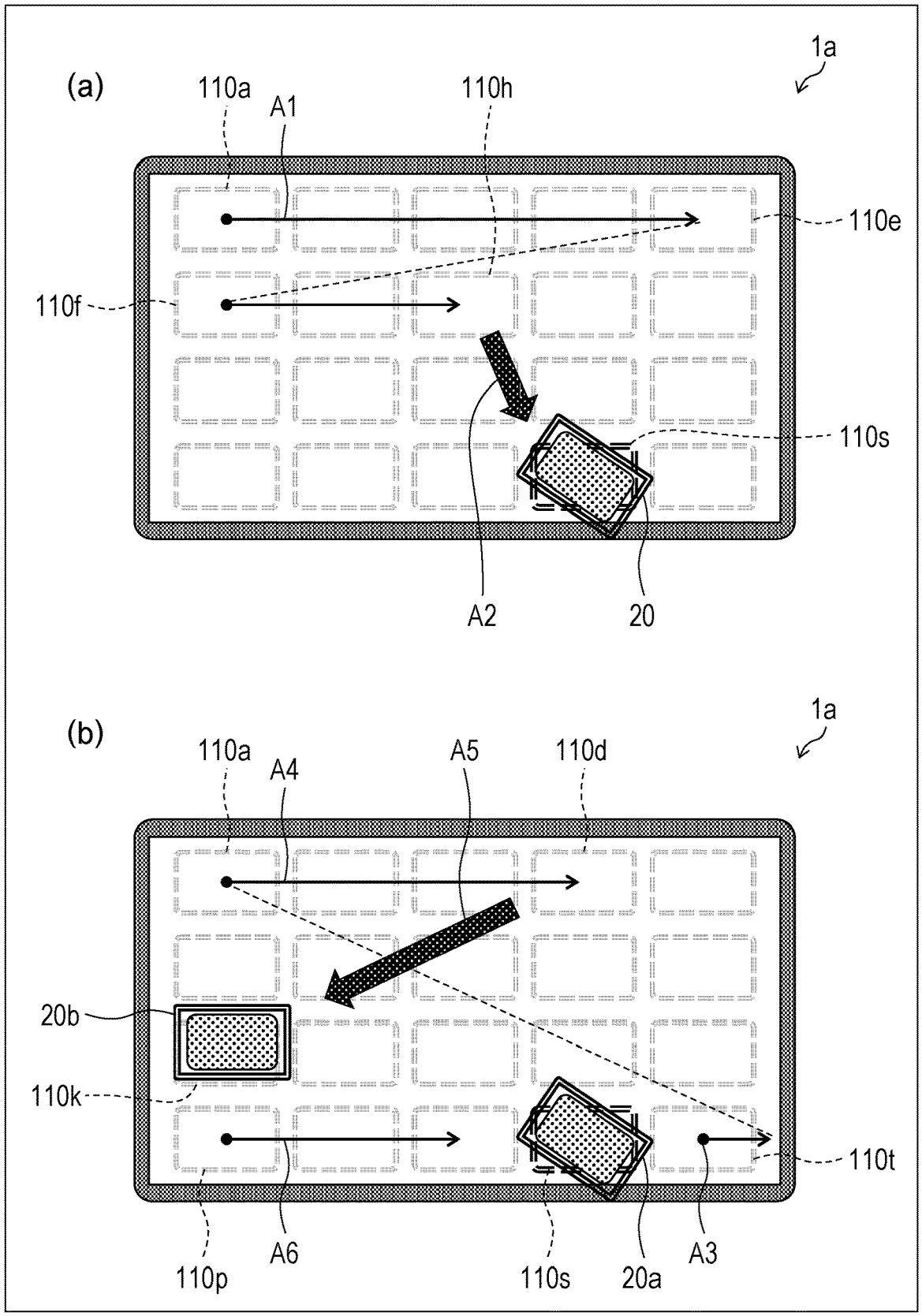
FIG. 7 is a schematic view depicting an example of the external appearance of an NFC communication system according to embodiment 2 of the present disclosure.

FIG. 7 is a schematic view depicting an example of the external appearance of the NFC communication system 1a according to the present embodiment. FIG. 7(a) is a schematic view depicting a case where an NFC terminal 20 is in contact with the touch panel 120.

In the NFC communication system 1a, as depicted in FIG. 7, the information processing device 10a carries out scan driving on the NFC antennas 110 in the direction of the arrow A1 in FIG. 7, for example. Then, when the touch panel 120 detects contact, the information processing device 10a stops the scan driving, and drives the NFC antenna 110 that corresponds to the contact position detected by the touch panel 120. Furthermore, in a case where an NFC antenna 110 driven by means of scan driving has detected an NFC tag, the information processing device 10a carries out near field communication by means of that NFC antenna 110.

Flow of Processing Executed by Information Processing Device 10a

Figure 8:
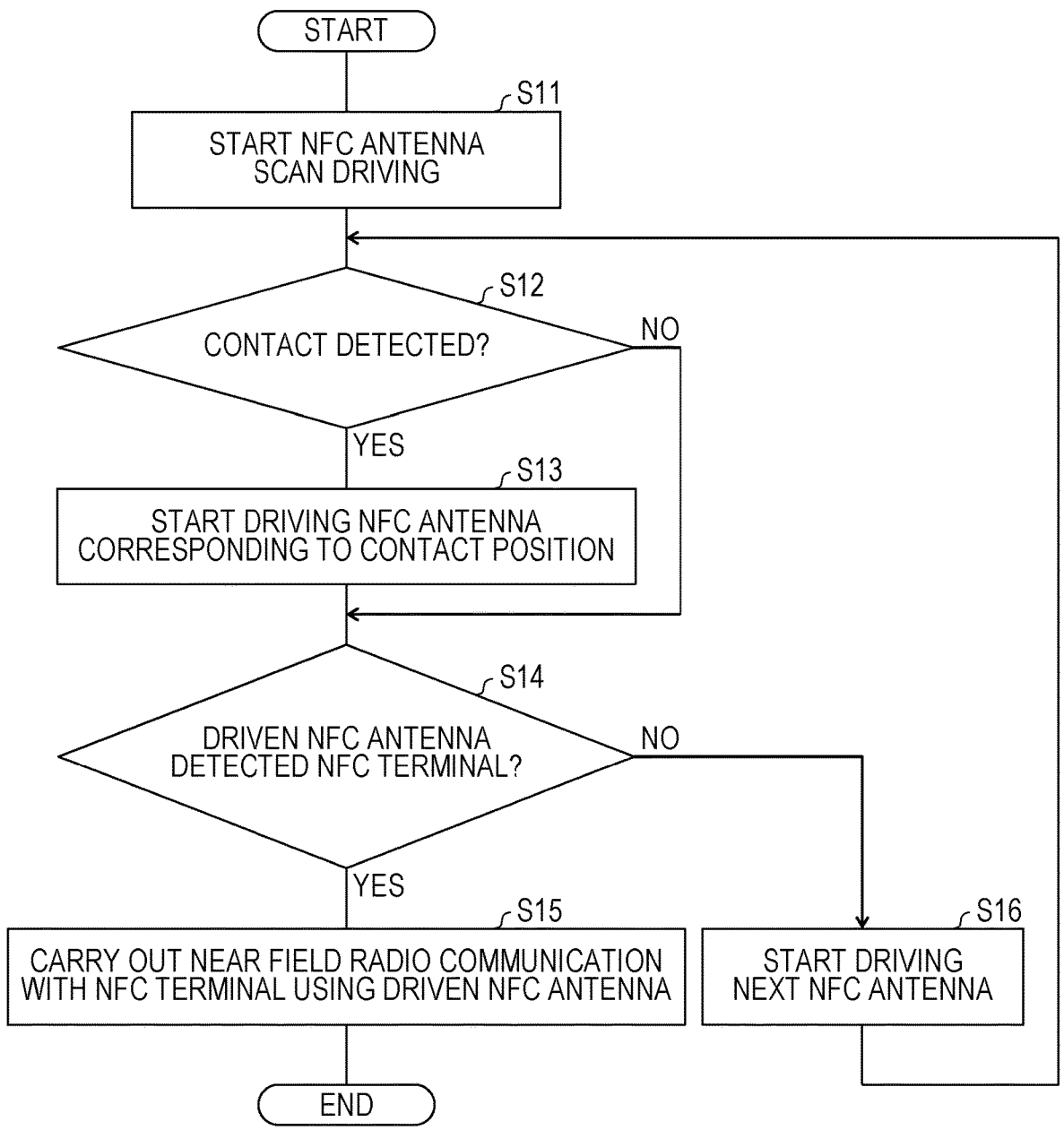
FIG. 8 is a flowchart depicting an example of the flow of processing executed by an information processing device in embodiment 2 of the present disclosure.

FIG. 8 is a flowchart depicting an example of the flow of processing executed by the information processing device 10a in the present embodiment. The processing executed by the information processing device 10a will be described using FIG. 8.

(Step S11)

The NFC communication control unit 131a starts scan driving the NFC antennas 110. Here, the information processing device 10a may be a configuration that allows the user to designate settings for the scan driving such as the NFC antennas 110 to be driven and the drive timing (the interval until the next NFC antenna 110 is to be driven). For example, the information processing device 10a may display, on the display unit 140, a scan driving setting screen by executing an application, and may decide the scan driving settings by means of a user operation.

(Step S12)

The touch information processing unit 132 refers to the position information that is output from the touch panel 120, and determines whether or not the touch panel 120 has detected the contact of an object.

(Step S13)

In the case of YES in step S12, the NFC communication control unit 131a refers to the position information that is output from the touch panel 120, and starts driving the NFC antenna 110 that corresponds to the contact position of the object.

(Step S14)

However, in the case of NO in step S12, or after step S13 has been executed, the NFC communication control unit 131a determines whether or not the driven NFC antenna 110 has detected an NFC terminal 20.

(Step S15)

In the case of YES in step S14, the NFC communication control unit 131a carries out near field communication with the NFC terminal 20 by means of the driven NFC antenna 110. It should be noted that the processing depicted in FIG. 8 may return to the processing of step S11 after the processing of step S15 has been executed.

(Step S16)

However, in the case of NO in step S14, the NFC communication control unit 131a starts driving the next NFC antenna 110 by means of scan driving. This is because the object that has been brought into contact is not an NFC terminal 20 or an object is not proximate to the touch panel 120.

In this way, in the NFC communication system 1a according to the present embodiment, the information processing device 10a carries out scan driving of the NFC antennas 110, and, when an NFC antenna 110 detects the NFC terminal 20, communicates with the NFC terminal 20 by means of the NFC antenna 110. Furthermore, in a case where the touch panel 120 has detected contact, the information processing device 10a starts driving the NFC antenna 110 that corresponds to the contact position. Therefore, the information processing device 10a is able to appropriately decide the NFC antenna 110 to be driven by means of scan driving, even when being a configuration in which the touch panel 120 does not detect contact. Furthermore, in a case where the touch panel 120 has detected contact, it is possible to improve the speed at which communication is started by the NFC antenna 110 that is to carry out communication.

Furthermore, the NFC communication system 1a may be a configuration that carries out scan driving for NFC antennas 110 excluding the drive target antenna after communication processing carried out by the drive target antenna has ended. This configuration will be described using FIG. 7(b).

After communication processing carried out by the NFC antenna 110s has ended, the NFC communication control unit 131a first starts scan driving from the NFC antenna 110t as depicted by the arrow A3 in FIG. 7(b). Next, the NFC communication control unit 131a starts scan driving from the NFC antenna 110a toward the right, as depicted by the arrow A4. If the touch panel 120 detects contact by an NFC terminal 20b when the NFC antenna 110d is being driven, the NFC communication control unit 131a drives the NFC antenna 110k that corresponds to the contact position, as the drive target antenna, as depicted by the arrow A5. After communication processing carried out by the NFC antenna 110k has ended, the NFC communication control unit 131a once again starts scan driving as depicted by the arrow A6.

Here, in a case where there is no change in the position of contact by the NFC terminal 20a, the NFC communication control unit 131a starts scan driving as depicted by the arrow A3 without driving the NFC antenna 110s that has already finished communication processing (may also be referred to as "skipping" hereinafter). According to this configuration, the information processing device 10a is able to suppress power consumption by skipping scan driving of NFC antennas 110 that have already finished communication processing.

Furthermore, the NFC communication control unit 131a may be a configuration that acquires terminal information of an NFC terminal 20 that has carried out communication, from the NFC terminal 20, and associates a contact position and the terminal information. Here, in a case where the type of contact carried out by the NFC terminal 20 has been "MOVE", the NFC communication control unit 131a associates the contact type "MOVE" and the terminal information. Then, the NFC communication control unit 131a may be a configuration that does not drive an NFC antenna 110 that corresponds to a movement destination, in a case where terminal information acquired at the movement destination for the NFC terminal 20 has been terminal information associated with the contact type "MOVE". Furthermore, the NFC communication control unit 131a may be a configuration that, in the scan driving, skips an NFC antenna 110 that corresponds to a movement destination. According to this configuration, the information processing device 10 drives the NFC antennas 110 without carrying out communication once again with an NFC terminal 20 that has temporarily carried out communication, and is therefore able to suppress power consumption.

Embodiment 3

Yet another embodiment of the present disclosure is as follows when described on the basis of FIGS. 9 and 10. It should be noted that, for convenience of the description, members having the same functions as the members described in the aforementioned embodiment are denoted by the same reference signs and descriptions thereof are omitted.

In the aforementioned embodiment, a description was given regarding a case where NFC antennas 110 that are arranged in a matrix are used; however, in the present embodiment, a description will be given regarding a case where NFC antennas 111 that horizontally traverse (or vertically traverse) the touch panel 120 are used.
(NFC Communication System 1b)

An NFC communication system 1b is constituted by an information processing device 10b and an NFC terminal 20. The information processing device 10b is provided with the NFC antennas 111 instead of the NFC antennas 110 in the aforementioned information processing device 10 or information processing device 10a.

Furthermore, the information processing device 10b is provided with a control unit 130b instead of the control unit 130a in the aforementioned information processing device 10a. The control unit 130b also functions as an NFC communication control unit 131b instead of the NFC communication control unit 131a in the aforementioned control unit 130a. The NFC communication control unit 131b drives the NFC antennas 111 instead of the NFC antennas 110.

Example of External Appearance of NFC Communication System 1b

Figure 9:
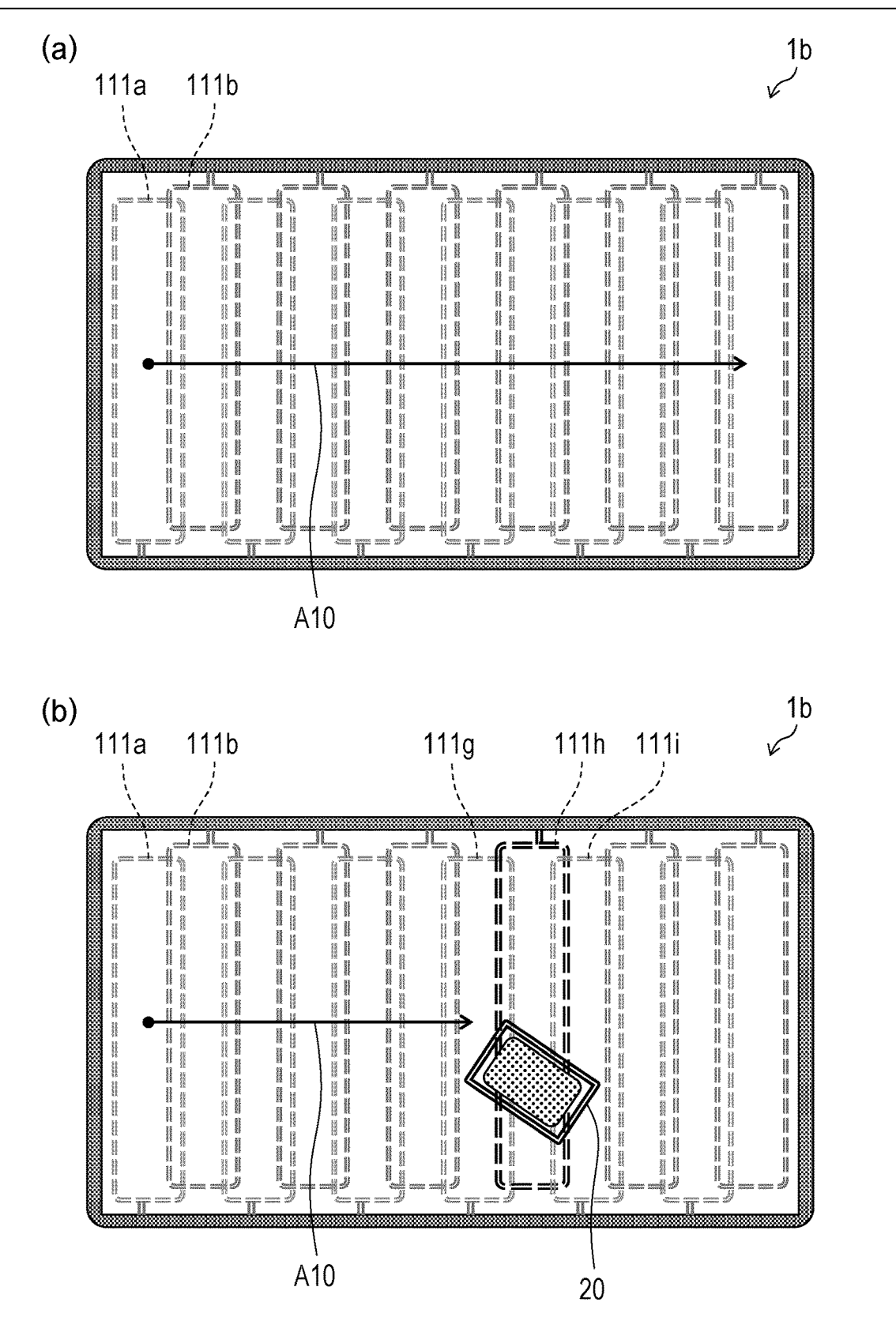
FIG. 9 is a schematic view depicting an example of the external appearance of an NFC communication system according to embodiment 3 of the present disclosure.

FIG. 9 is a schematic view depicting an example of the external appearance of the NFC communication system 1b according to the present embodiment. FIG. 9(a) is a schematic view depicting scan driving of the information processing device 10b, and FIG. 9(b) is a schematic view depicting a case where an NFC terminal 20 is in contact with the touch panel 120.

The information processing device 10b is provided with a plurality of NFC antennas 111 that vertically traverse the touch panel 120, as depicted in FIG. 9(a). A portion of each of the plurality of NFC antennas 111 is arranged so as to superpose an adjacent NFC antenna 111. For example, the NFC antennas 111a are arranged so that the right side of an NFC antenna 111a and the left side of an adjacent NFC antenna 111b are superposed. The NFC antennas 111 are transparent similar to the aforementioned NFC antennas 110, and are inserted between a touch panel module and a liquid crystal panel module. Furthermore, the NFC antennas 111 are able to communicate at the same time with a plurality of NFC terminals.

Furthermore, the NFC antennas 111 are arranged so that there are no gaps in the touch panel 120. FIG. 9(a) depicts a structure in which the NFC antennas 111 are terminated inside the touch panel 120; however, a structure may be adopted in which the NFC antennas 111 are terminated by an FPC (flexible printed circuit) or the like in the end sections or the like of the touch panel 120. With this structure, the NFC antennas 111 can be arranged so that there are even fewer gaps in the touch panel 120.

The NFC communication control unit 131b scan drives the NFC antennas 111 from left to right as depicted by the arrow A10 in FIG. 9(a). It should be noted that the scan driving method is not restricted thereto, and a possible example is a configuration in which the NFC communication control unit 131b drives only odd-numbered (or even-numbered) NFC antennas 111 from the left, or the like.

If a driven NFC antenna 111h detects an NFC terminal 20 as depicted in FIG. 9(b), the NFC communication control unit 131b carries out near field communication with the NFC terminal 20 by means of the NFC antenna 111h. Here, the NFC communication control unit 131b may be a configuration that also sequentially drives the NFC antenna 111g and the NFC antenna 111i, which are antennas that are adjacent to the NFC antenna 111h, in addition to the NFC antenna 111h. In this case, the NFC communication control unit 131b may drive the NFC antenna 111 that first communicated with the NFC terminal 20, as the drive target antenna, from among the NFC antenna 111g, the NFC antenna 111h, and the NFC antenna 111i. Furthermore, the NFC communication control unit 131b may allow communication between the NFC terminal 20 and each of the NFC antenna 111g, the NFC antenna 111h, and the NFC antenna 111i, and confirm whether or not the communication results are the same.

Furthermore, in a case where the touch panel 120 has detected the contact of an object, the NFC communication control unit 131b starts driving the NFC antenna 111 that corresponds to the contact position.

Example 1 of Communication with Plurality of NFC Terminals 20

Figure 10:
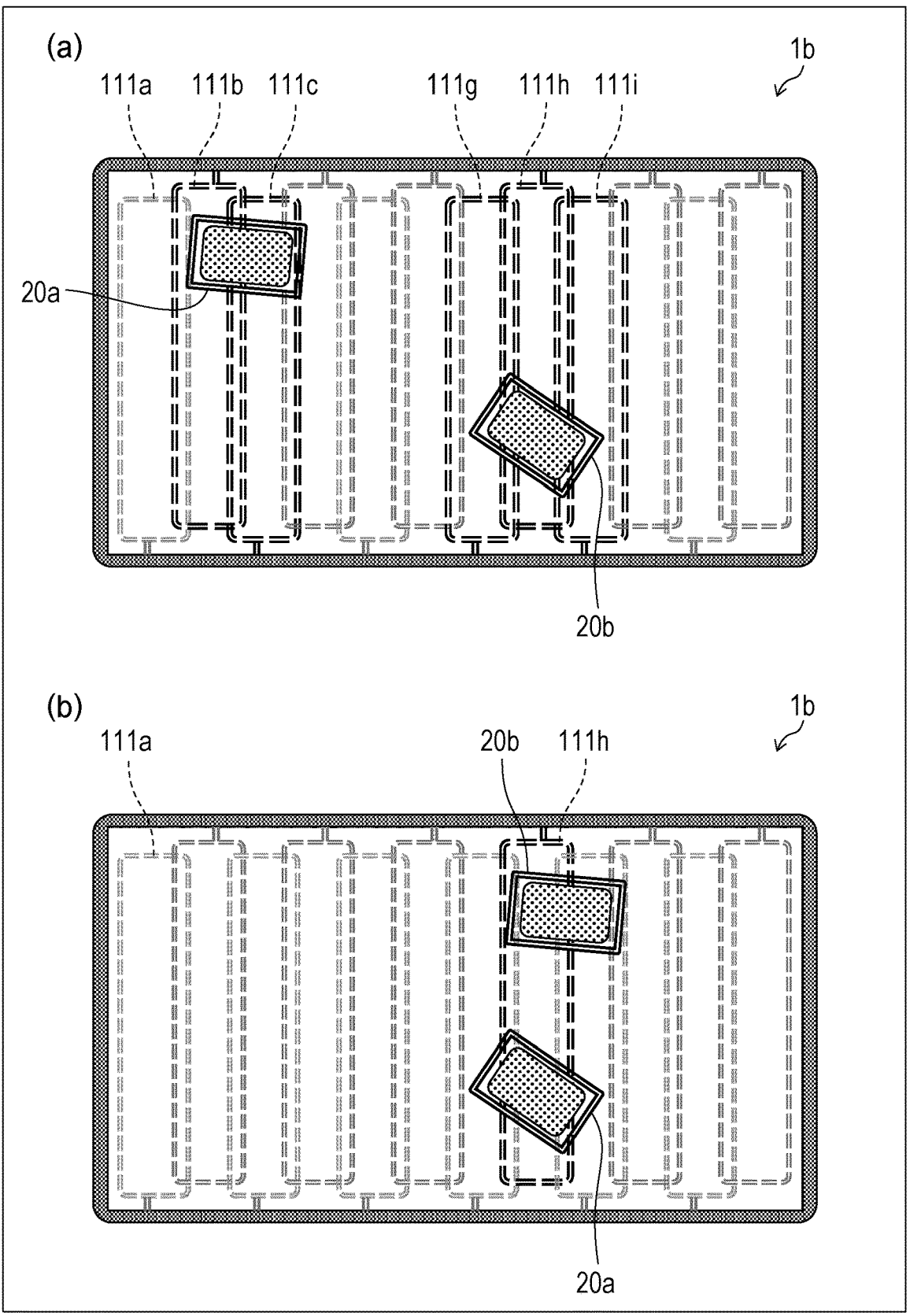
FIG. 10 is a schematic view depicting a case where an information processing device is able to communicate with a plurality of NFC terminals in embodiment 3 of the present disclosure.

FIG. 10 is a schematic view depicting a case where the information processing device 10b is able to communicate with a plurality of NFC terminals 20 in the present embodiment. FIG. 10(a) is a schematic view depicting a case where different NFC antennas 111 and the NFC terminals 20a and 20b communicate, and (b) is a schematic view depicting a case where one NFC antenna 111 and the NFC terminal 20a and NFC terminal 20b communicate.

As depicted in FIG. 10(a), in a case where the touch panel 120 has detected contact by the NFC terminal 20a and the NFC terminal 20b, the NFC communication control unit 131b starts driving the NFC antenna 111c and NFC antenna 111h that correspond to the respective contact positions. The NFC communication control unit 131b then communicates with the NFC terminal 20a and the NFC terminal 20b. Here, the NFC communication control unit 131b may be a configuration that drives an antenna that is adjacent to the drive target antenna.

Example 2 of Communication with Plurality of NFC Terminals 20

Furthermore, the NFC communication control unit 131b specifies how many of the NFC terminals 20 are able to communicate with the drive target antenna. In the schematic view depicted in FIG. 10(a), there is one NFC terminal 20 that is capable of communication at each of the NFC antenna 111c and the NFC antenna 111h. However, in the schematic view depicted in FIG. 10(b), there are two NFC terminals 20 that are capable of communication, the NFC terminal 20a and the NFC terminal 20b, at the NFC antenna 111h. In this case, the NFC communication control unit 131b is able to communicate with each of the NFC terminal 20a and the NFC terminal 20b at the same time by implementing an anti-collision setting.

Furthermore, the information processing device 10b in the present embodiment may also be a configuration that, in a case where a contact position has not moved a prescribed distance or more after communication processing has ended, stops the driving of the NFC antenna 111 that carried out the communication processing in question.

Example 3 of Communication with Plurality of NFC Terminals 20

In the schematic view depicted in FIG. 10(b), in a case where the NFC terminal 20b has been brought into proximity with a position that corresponds to the NFC antenna 111h after the information processing device 10b has ended communication processing with the NFC terminal 20a via the NFC antenna 111h, the NFC communication control unit 131b executes the processing described hereinafter.

In a case where the position of contact by the NFC terminal 20a has not moved a prescribed distance or more, the NFC communication control unit 131b starts communication processing with the NFC terminal 20b that has been brought into proximity thereafter, with the communication processing with the NFC terminal 20a remaining finished. In this case, the NFC communication control unit 131b stores the terminal type or the like of the NFC terminal 20a in a memory in advance when communicating with the NFC terminal 20a. The NFC communication control unit 131b then starts communication processing with the NFC terminal 20b, and, when having acquired the terminal types of the NFC terminal 20a and the NFC terminal 20b, does not communicate with the NFC terminal 20a, which matches the terminal type stored in the memory in advance, and communicates with the NFC terminal 20b.

In a case where the position of contact by the NFC terminal 20a has moved a prescribed distance or more, the NFC communication control unit 131b starts communication processing with the NFC terminal 20a and the NFC terminal 20b.

In this way, in the NFC communication system 1b according to the present embodiment, the information processing device 10b is able to communicate with a plurality of NFC terminals 20 by driving one NFC antenna 111. Therefore, the information processing device 10b is able to suppress power consumption.

Embodiment 4

Yet another embodiment of the present disclosure is as follows when described on the basis of FIGS. 11 and 12. It should be noted that, for convenience of the description, members having the same functions as the members described in the aforementioned embodiment are denoted by the same reference signs and descriptions thereof are omitted.

In embodiment 3, a description was given regarding a case where NFC antennas 111 that vertically traverse the touch panel 120 are used. In contrast, in embodiment 4, a description will be given regarding a case where NFC antennas 113 that horizontally traverse the touch panel 120 are used in addition to NFC antennas 112 that vertically traverse the touch panel 120.

(NFC Communication System 1c)

An NFC communication system 1c is constituted by an information processing device 10c and an NFC terminal 20. The information processing device 10c is provided with the NFC antennas 112 and the NFC antennas 113 instead of the NFC antennas 111 in the aforementioned information processing device 10b.

Furthermore, the information processing device 10c functions as an NFC communication control unit 131c instead of the NFC communication control unit 131b in the control unit 130b in the aforementioned information processing device 10b. The NFC communication control unit 131b drives the NFC antennas 112 and the NFC antennas 113 instead of the NFC antennas 111.

Example of External Appearance of NFC Communication System 1c

Figure 11:
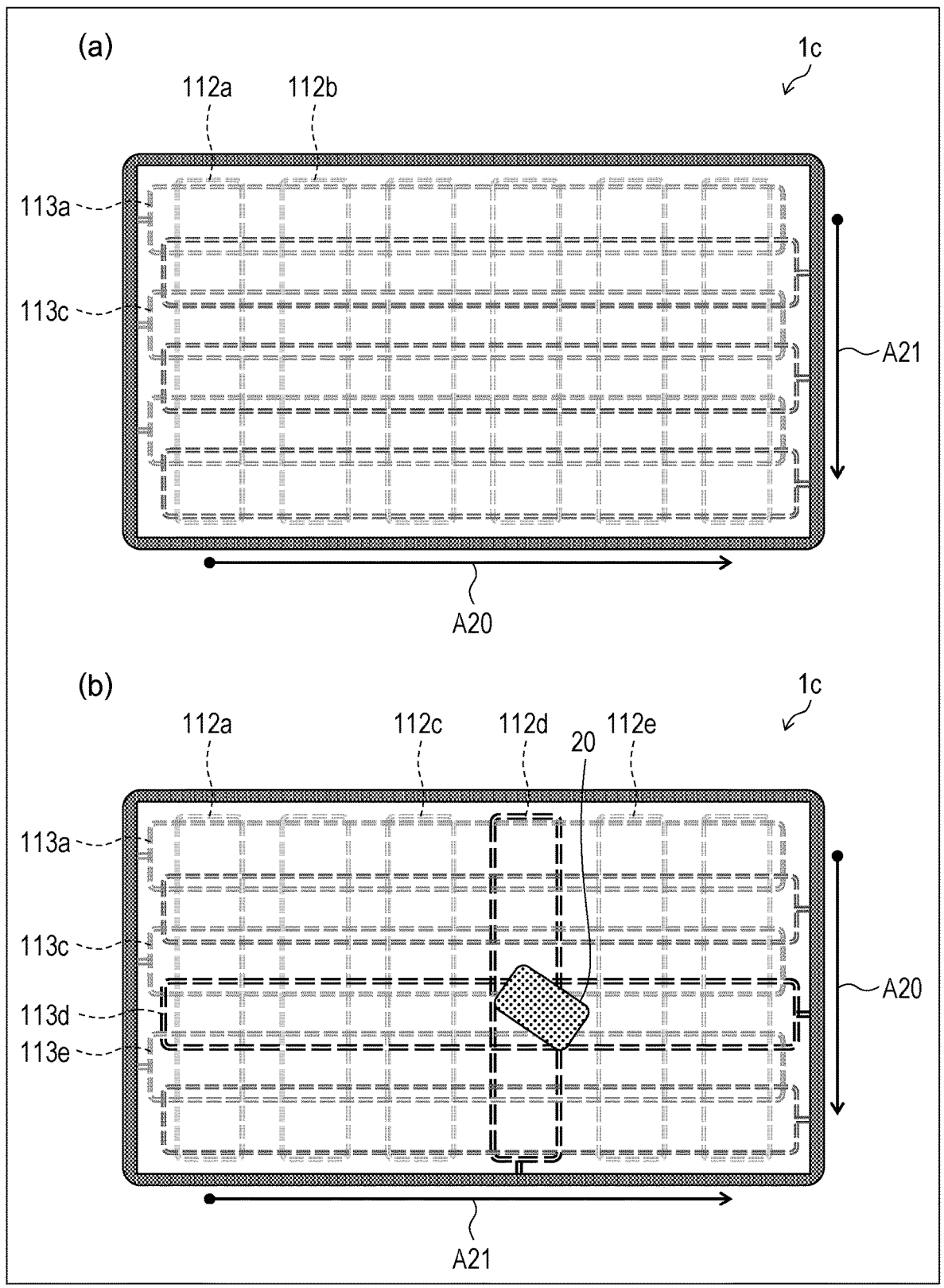
FIG. 11 is a schematic view depicting an example of the external appearance of an NFC communication system according to embodiment 4 of the present disclosure.

FIG. 11 is a schematic view depicting an example of the external appearance of the NFC communication system 1c according to the present embodiment. FIG. 11(a) is a schematic view depicting scan driving of the information processing device 10c, and FIG. 11(b) is a schematic view depicting a case where an NFC terminal 20 is in contact with the touch panel 120.

The information processing device 10c is provided with the plurality of NFC antennas 112 that vertically traverse the touch panel 120, and the plurality of NFC antennas 113 that horizontally traverse the touch panel 120, as depicted in FIG. 11(a). The NFC antennas 112 and the NFC antennas 113 are each transparent similar to the NFC antennas 110. An NFC antenna module provided with the NFC antennas 112 and an NFC antenna module provided with the NFC antennas 113 are inserted between a touch panel module and a liquid crystal panel module. Furthermore, the NFC antennas 112 and the NFC antennas 113 are each able to communicate with a plurality of NFC terminals at the same time.

Furthermore, the NFC antennas 112 and the NFC antennas 113 are arranged so that there are no gaps in the touch panel 120. The NFC antennas 112 and the NFC antennas 113 may be terminated by an FPC or the like in the end sections or the like of the touch panel 120, similar to the aforementioned embodiment.

The NFC communication control unit 131c first scan drives the NFC antennas 112 from left to right as depicted by the arrow A20 in FIG. 11(a). When the scan driving of the NFC antennas 112 ends, the NFC communication control unit 131c drives the NFC antennas 113 from top to bottom as depicted by the arrow A21. It should be noted that the scan driving method is not restricted thereto, and, for example, the NFC communication control unit 131c may be a configuration that scan drives the NFC antennas 112, and, upon detecting the NFC terminal 20, starts scan driving the NFC antennas 113. Alternatively, the NFC communication control unit 131c may be a configuration that scan drives the NFC antennas 113, and, upon detecting the NFC terminal 20, starts scan driving the NFC antennas 112.

In a case where the touch panel 120 has detected the contact of an object, the NFC communication control unit 131c starts driving the NFC antenna 112 or the NFC antenna 113 that corresponds to the contact position. Here, the NFC communication control unit 131ca drives the NFC antenna 112 or the NFC antenna 113 that is nearest the contact position. The NFC communication control unit 131ca may be a configuration that carries out communication by means of both an NFC antenna 112 and an NFC antenna 113 in a case where the NFC antenna that is nearest the contact position was an NFC antenna 112 and an NFC antenna 113. In this case, the NFC communication control unit 131ca may be a configuration that confirms that information acquired from both is the same information. Furthermore, the NFC communication control unit 131ca may drive either of the NFC antenna 112 and the NFC antenna 113. The NFC communication control unit 131ca may be a configuration that drives another NFC antenna in a case where it is not possible to drive and communicate with either of the NFC antenna 112 and the NFC antenna 113.

For example, in the schematic view depicted in FIG. 11(b), the NFC communication control unit 131c starts driving the NFC antenna 112d and the NFC antenna 113d, which correspond to the position of contact by the NFC terminal 20. Furthermore, the NFC communication control unit 131c may be a configuration that drives an adjacent NFC antenna in addition to the NFC antenna that is nearest the contact position. In the schematic view depicted in FIG. 11(b), the NFC communication control unit 131c may drive the NFC antenna 112c and the NFC antenna 112e in addition to the NFC antenna 112d. Furthermore, the NFC communication control unit 131c may drive the NFC antenna 113c and the NFC antenna 113e in addition to the NFC antenna 113d.

Example 1 of Communication with Plurality of NFC Terminals 20

Figure 12:
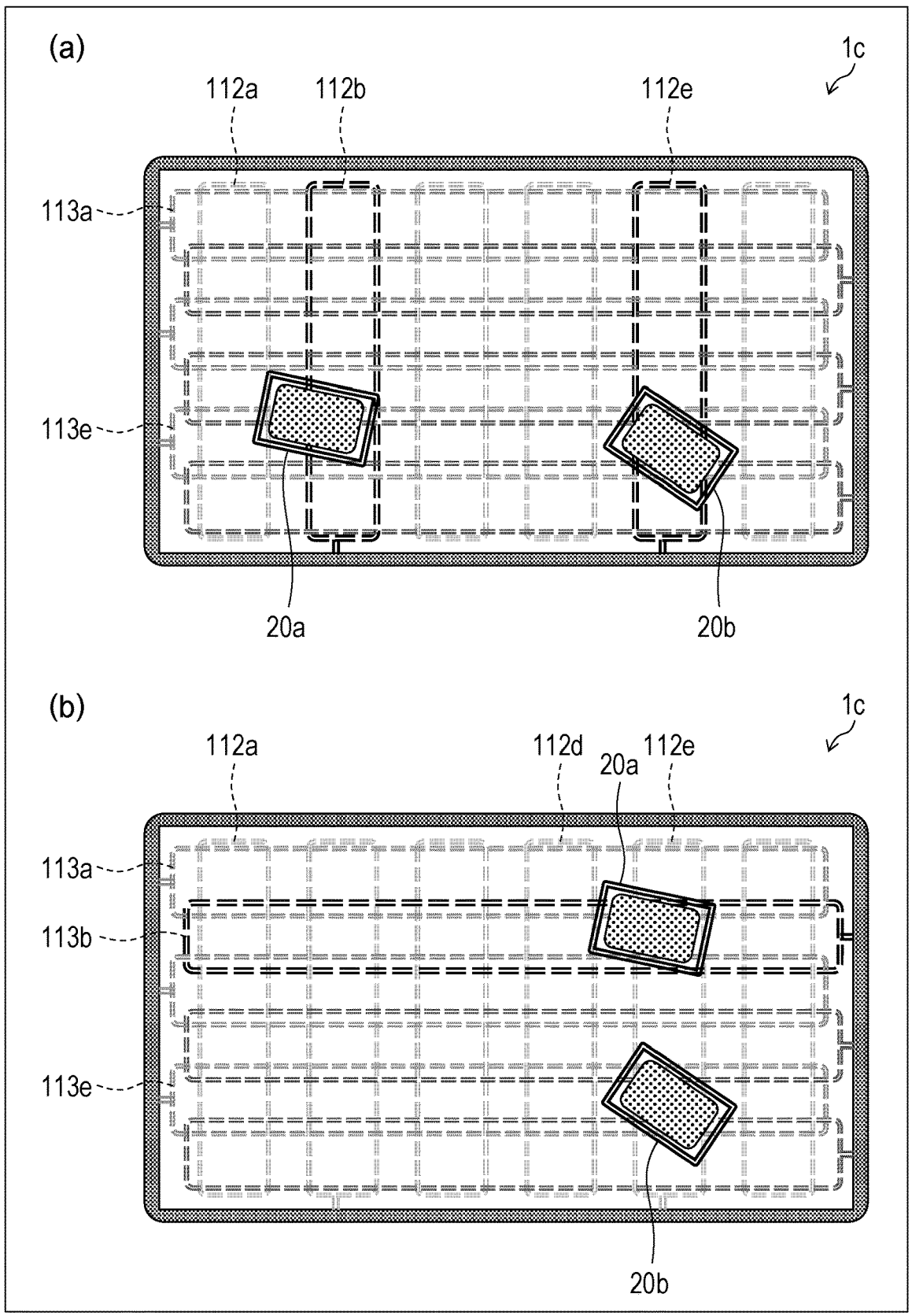
FIG. 12 is a schematic view depicting a case where an information processing device is able to communicate with a plurality of NFC terminals in embodiment 4 of the present disclosure.

FIG. 12 is a schematic view depicting a case where the information processing device 10c is able to communicate with a plurality of NFC terminals 20 in the present embodiment. FIG. 12(a) is a schematic view depicting a case where two NFC terminals 20 are able to communicate with one NFC antenna 113e.

As depicted in FIG. 12(a), in a case where the touch panel 120 detected contact by the NFC terminal 20a and the NFC terminal 20b, and the NFC antenna that corresponds to the respective contact positions was the same NFC antenna 113e, the NFC communication control unit 131c starts driving the NFC antenna 113e. In addition, the NFC communication control unit 131c starts sequentially driving the NFC antennas 112, and specifies the NFC antennas 112 that detect the NFC terminal 20a and the NFC terminal 20b. In FIG. 12(a), the NFC communication control unit 131c specifies the NFC antenna 112b that detects the NFC terminal 20a, and specifies the NFC antenna 112e that detects the NFC terminal 20b. According to this configuration, the information processing device 10c is able to specify the positions of the NFC terminal 20a and the NFC terminal 20b. Therefore, the information processing device 10c is able to carry out payment processing for the NFC terminal 20a and the NFC terminal 20b at the same time, with a screen in which the NFC terminal 20a carries out payment processing being displayed at the left side of the screen, and a screen in which the NFC terminal 20b carries out payment processing being displayed at the right side of the screen, for example.

Example 2 of Communication with Plurality of NFC Terminals 20

FIG. 12(b) is a schematic view depicting a case where two NFC terminals 20 are able to communicate with one NFC antenna 112e.

As depicted in FIG. 12(b), in a case where the touch panel 120 detects contact by the NFC terminal 20a, and the NFC terminal 20b is brought into contact with the touch panel 120 while the NFC antenna 112e is being driven, the NFC communication control unit 131c executes the processing described hereinafter.

In a case where the position of contact by the NFC terminal 20a has not moved a prescribed distance or more, the NFC communication control unit 131c starts communication processing with the NFC terminal 20b by driving the NFC antenna 112e, with the communication processing with the NFC terminal 20a remaining finished. Alternatively, the NFC communication control unit 131c may be a configuration that drives the NFC antenna 113b, which is different from the NFC antenna 112e.

In this way, in the NFC communication system 1c according to the present embodiment, the information processing device 10c is able to appropriately communicate with each of a plurality of NFC terminals 20 by driving the NFC antennas 112 or the NFC antennas 113. Furthermore, the information processing device 10c is able to recognize the position of the NFC terminal 20 that is communicating, by driving the NFC antennas 112 and the NFC antennas 113.

Example of Implementation by Means of Software

Control blocks for the information processing devices 10 to 10c and the NFC terminals 20 to 20b (particularly the control units 130 to 130c and the terminal control unit 220) may be realized by means of logic circuits (hardware) formed in an integrated circuit (IC chip) or the like. Furthermore, the control blocks may be realized by means of software using a CPU (central processing unit).

In the case of the latter, the information processing devices 10 to 10c and the NFC terminals 20 to 20b are provided with a CPU, a ROM (read only memory) or a storage device (these are referred to as a "recording medium"), a RAM (random access memory), and the like. The CPU executes instructions of a program that is software for realizing each function. In the recording medium, the program and various types of data are recorded in a computer (or CPU) readable manner. The RAM deploys the program. The objective of the present disclosure is then achieved by the computer (or the CPU) reading the program from the recording medium and executing the program. As the recording medium, it is possible to use a "non-transitory tangible media"; for example, tape, a disk, a card, a semiconductor memory, a programmable logic circuit, or the like. Furthermore, the program may be provided to the computer via an arbitrary transmission medium (a communication network, broadcast waves, or the like) that is capable of transmitting said program. It should be noted that one aspect of the present disclosure can also be realized in the form of a data signal that is embedded in carrier waves, in which the program is realized by means of an electronic transmission.

CROSS-REFERENCE TO RELATED APPLICATION

The present application claims the benefit of priority from Japanese Patent Application No. 2016-188787 filed on Sep. 27, 2016, the entire contents of which are included herein by reference thereto.

SUMMARY

An antenna module (information processing devices 10 to 10c) according to aspect 1 of the present disclosure is provided with: a touch panel (120) that detects an object that has been brought into contact or proximity; a plurality of near field communication antennas (NFC antennas 111, 112, 113) arranged superposing the touch panel; and a control unit (130 to 130c) that controls the antennas, in which the control unit starts driving a drive target antenna which is one or more antennas that correspond to a contact position or proximity position of the object detected by the touch panel, from among the plurality of antennas.

According to the aforementioned configuration, the antenna module is able to drive antennas that carry out near field communication on the basis of a contact position, and is therefore able to improve the speed at which communication is started by an antenna that is to carry out communication.

In an antenna module according to aspect 2 of the present disclosure, the control unit in the aforementioned aspect 1 may start driving a most proximate antenna that is nearest the contact position or proximity position, as the drive target antenna.

According to the aforementioned configuration, the antenna module is able to improve the speed at which communication is started by an antenna that is to carry out near field communication. Furthermore, the antenna module does not drive antennas that are not near the contact position, and is therefore able to suppress power consumption.

In an antenna module according to aspect 3 of the present disclosure, the control unit in the aforementioned aspect 2 may start driving one or more antennas that are adjacent to the most proximate antenna, in addition to the most proximate antenna, as the driving target antenna.

According to the aforementioned configuration, the antenna module is able to carry out communication regardless of the place in which an antenna is arranged, in a communication destination device or the like.

In an antenna module according to aspect 4 of the present disclosure, the control unit in any of the aforementioned aspects 1 to 3 may stop the drive target antenna after communication processing carried out by the drive target antenna has ended.

According to the aforementioned configuration, the antenna module is able to prevent interference caused by driving a plurality of antennas. Furthermore, the antenna module is able to improve the speed at which communication is started by an antenna when an antenna is next driven.

In an antenna module according to aspect 5 of the present disclosure, the control unit in the aforementioned aspect 4 may once again start driving the drive target antenna after a prescribed time has elapsed from stopping the drive target antenna.

According to the aforementioned configuration, the antenna module is able to once again carry out communication processing appropriately even with a communication partner that has temporarily stopped communication processing.

In an antenna module according to aspect 6 of the present disclosure, the control unit in the aforementioned aspect 4 may, in a case where the contact position or proximity position has moved a prescribed distance or more after the communication processing carried out by the drive target antenna has ended, start driving one or more antennas that correspond to the contact position or proximity position after having moved.

According to the aforementioned configuration, the antenna module is able to alter the drive target antenna in accordance with a change in the contact position.

In an antenna module according to aspect 7 of the present disclosure, the control unit in the aforementioned aspect 6 may, while the contact position or proximity position is moving, decide to not drive one or more antennas that correspond to the contact position or proximity position that is moving.

According to the aforementioned configuration, the antenna module does not drive an antenna that corresponds to a contact position that is moving, and is therefore able to suppress power consumption.

In an antenna module according to aspect 8 of the present disclosure, the control unit in the aforementioned aspect 6 may, in a case where the speed of movement of the contact position or proximity position is less than or equal to a prescribed speed, start driving one or more antennas that correspond to the contact position or proximity position that is moving.

According to the aforementioned configuration, in a case where the contact position has moved slowly, the antenna module is able to drive antennas in accordance with the movement.

In an antenna module according to aspect 9 of the present disclosure, the control unit in any of the aforementioned aspects 1 to 4 may estimate the movement direction of the contact position or proximity position with reference to the locus of movement of the contact position or proximity position, and start driving one or more antennas that correspond to the estimated movement direction.

According to the aforementioned configuration, the antenna module is able to appropriately select the drive target antenna.

In an antenna module according to aspect 10 of the present disclosure, the control unit in any of the aforementioned aspects 1 to 9 may, in a case where a plurality of contact positions or proximity positions have been detected within a prescribed time by the touch panel, the control unit may start driving, as a first driven antenna, one or more antennas that correspond to the contact position or proximity position that is first detected.

According to the aforementioned configuration, the antenna module is able to prevent interference caused by driving a plurality of antennas.

In an antenna module according to aspect 11 of the present disclosure, the control unit in the aforementioned aspect 10 may, after communication processing carried out by the first driven antenna has ended, stop the first driven antenna, and start driving, as a second driven antenna, one or more antennas that correspond to a contact position or proximity position that is subsequently detected.

According to the aforementioned configuration, it is possible to prevent interference caused by driving a plurality of antennas.

In an antenna module according to aspect 10 of the present disclosure, the control unit in any of the aforementioned aspects 1 to 9 may, in a case where a plurality of contact positions or proximity positions have been detected within a prescribed time by the touch panel, start driving, as a first driven antenna, one or more antennas that correspond to the contact position or proximity position that is first detected.

According to the aforementioned configuration, the antenna module is able to appropriately decide an antenna to be driven, by sequentially driving the antennas, even if the touch panel has not been able to detect contact.

In an antenna module according to aspect 13 of the present disclosure, the control unit in the aforementioned aspect 12 may, after the communication processing carried out by the drive target antenna has ended, sequentially drive antennas excluding an antenna serving as the drive target antenna, from among the plurality of antennas.

According to the aforementioned configuration, power consumption can be suppressed.

In an antenna module according to aspect 14 of the present disclosure, the control unit in any of the aforementioned aspects 1 to 13 may, in a case where the object detected by the touch panel is a terminal device that is able to communicate with the antennas, start driving the drive target antenna.

According to the aforementioned configuration, it is possible for an antenna to be driven only in a case where there is a high possibility of the terminal device having been brought into contact.

In an antenna module according to aspect 15 of the present disclosure, the control unit in the aforementioned aspect 14 may, in a case where an object that has been brought into contact with the touch panel has a coil, determine that the object is the terminal device.

According to the aforementioned configuration, it is possible to accurately detect that the terminal device has been brought into contact.

In an antenna module according to aspect 16 of the present disclosure, in a case where the shape of a contact surface, of the object, that makes contact with the touch panel is similar to the shape of the contact surface of the terminal device, which is registered in advance, the control unit in the aforementioned aspect 14 may determine that the object is the terminal device.

According to the aforementioned configuration, it is possible to accurately detect that the terminal device has been brought into contact.

In an antenna module according to aspect 17 of the present disclosure, the control unit in any of the aforementioned aspects 1 to 13 may, in a case where the object detected by the touch panel is an object other than a finger of a user, start driving the drive target antenna.

According to the aforementioned configuration, it is possible to avoid wasteful driving of antennas.

In an antenna module according to aspect 18 of the present disclosure, in a case where the shape of a contact surface, of the object, that makes contact with the touch panel is not similar to the shape of the contact surface of the finger of the user, which is registered in advance, the control unit in the aforementioned aspect 17 may determine that the object is an object other than the finger of the user.

According to the aforementioned configuration, it is possible to accurately determine whether or not a finger of the user has been brought into contact.

A display device (information processing devices 10 to 10*c*) according to aspect 19 of the present disclosure is provided with: the antenna module in any of the aforementioned aspects 1 to 18; and a display unit (140) that is arranged superposing the antenna module.

According to the aforementioned configuration, it is possible to realize the antenna module in any of the aforementioned aspects 1 to 13, provided with a display unit.

In a display device according to aspect 20 of the present disclosure, the control unit in the aforementioned aspect 19 may, after the drive target antenna has been stopped after the communication processing carried out by the drive target antenna has ended, in a case where an image displayed on the display unit has been altered, restart the communication processing carried out by the drive target antenna.

According to the aforementioned configuration, the display device is able to transmit and receive information in accordance with a change in a displayed image.

An antenna driving method according to aspect 21 of the present disclosure is an antenna driving method in an antenna module provided with: a touch panel that detects an object that has been brought into contact or proximity; a plurality of near field communication antennas arranged superposing the touch panel; and a control unit that controls the antennas, the antenna driving method including a step in which driving is started for a drive target antenna which is one or more antennas that correspond to a contact position or proximity position detected by the touch panel, from among the plurality of antennas.

According to the aforementioned configuration, it is possible to realize an antenna driving method that demonstrates an effect that is equivalent to the antenna module according to the aforementioned aspect 1.

The antenna module according to each aspect of the present disclosure may be realized by means of a computer, and, in this case, a control program for the antenna module that allows the antenna module to be realized by a computer by causing the computer to operate as the units (software elements) provided in the antenna module, and a computer-readable recording medium having the control program recorded thereon are also within the category of the present disclosure.

One aspect of the present disclosure is not restricted to the aforementioned embodiments, various alterations are possible within the scope indicated in the claims, and embodiments obtained by appropriately combining the technical means disclosed in each of the different embodiments are also included within the technical scope of the present disclosure. In addition, novel technical features can be formed by combining the technical means disclosed in each of the embodiments.

REFERENCE SIGNS LIST

1,1*a*,1*b*,1*c* NFC communication system
10,10*a*,10*b*,10*c* Information processing device
20,20*a*,20*b* NFC terminal
110,111,112,113 NFC antenna
120 Touch panel
130,130*a*,130*b*,130*c* Control unit
131,131*a*,131*b*,131*c* NFC communication control unit
132 Touch information processing unit
133 Display control unit
140 Display unit

The invention claimed is:
1. An antenna module comprising:
   a touch panel that detects an object that has been brought into contact or proximity;
   a plurality of near field communication antennas arranged superposing the touch panel; and
   a control unit that controls the plurality of near field communication antennas,
   wherein the control unit starts driving a drive target antenna which is one or more near field communication antennas that correspond to a contact position or proximity position of the object detected by the touch panel, from among the plurality of near field communication antennas,
   wherein the control unit stops the drive target antenna after communication processing carried out by the drive target antenna has ended, and wherein, in a case where the contact position or proximity position has moved a prescribed distance or more after the communication processing carried out by the drive target antenna has ended, the control unit starts driving one or more of the plurality of near field communication antennas that correspond to the contact position or proximity position after having moved.

2. The antenna module according to claim 1, wherein the control unit starts driving a most proximate antenna that is nearest the contact position or proximity position, as the drive target antenna.

3. The antenna module according to claim 2, wherein the control unit starts driving one or more of the plurality of near field communication antennas that are adjacent to the most proximate antenna, in addition to the most proximate antenna, as the drive target antenna.

4. The antenna module according to claim 1, wherein, while the contact position or proximity position is moving, the control unit decides to not drive one or more of the plurality of near field communication antennas that correspond to the contact position or proximity position that is moving.

5. The antenna module according to claim 1, wherein, in a case where a speed of movement of the contact position or proximity position is less than or equal to a prescribed speed, the control unit starts driving one or more of the plurality of near field communication antennas that correspond to the contact position or proximity position that is moving.

6. The antenna module according to claim 1, wherein, in a case where the object detected by the touch panel is a terminal device that is able to communicate with the plurality of near field communication antennas, the control unit starts driving the drive target antenna.

7. The antenna module according to claim 6, wherein, in a case where an object that has been brought into contact with the touch panel has a coil, the control unit determines that the object is the terminal device.

8. The antenna module according to claim 6, wherein, in a case where a shape of a contact surface, of the object, that makes contact with the touch panel is the same as a shape of the contact surface of the terminal device, which is registered in advance, the control unit determines that the object is the terminal device.

9. The antenna module according to claim 1, wherein, in a case where the object detected by the touch panel is an object other than a finger of a user, the control unit starts driving the drive target antenna.

10. The antenna module according to claim 9, wherein, in a case where a shape of a contact surface, of the object, that makes contact with the touch panel is different from a shape of the contact surface of the finger of the user, which is registered in advance, the control unit determines that the object is an object other than the finger of the user.

11. A display device comprising:
the antenna module according to claim 1; and
a display unit that is arranged superposing the antenna module.

12. The display device according to claim 11, wherein, after the drive target antenna has been stopped after the communication processing carried out by the drive target antenna has ended, in a case where an image displayed on the display unit has been altered, the control unit restarts the communication processing carried out by the drive target antenna.

13. A control program for causing a computer to function as the control unit according to claim 1.

14. A computer-readable recording medium having recorded thereon the control program according to claim 13.

15. An antenna module comprising:
a touch panel that detects an object that has been brought into contact or proximity;
a plurality of near field communication antennas arranged superposing the touch panel; and
a control unit that controls the plurality of near field communication antennas,
wherein the control unit starts driving a drive target antenna which is one or more near field communication antennas that correspond to a contact position or proximity position of the object detected by the touch panel, from among the plurality of near field communication antennas,
wherein, in a case where a plurality of contact positions or proximity positions have been detected within a prescribed time by the touch panel, the control unit starts driving, as a first driven antenna, one or more of the plurality of near field communication antennas that correspond to a contact position or proximity position that is first detected, and
wherein, after communication processing carried out by the first driven antenna has ended, the control unit stops the first driven antenna, and starts driving, as a second driven antenna, one or more of the plurality of near field communication antennas that correspond to a contact position or proximity position that is subsequently detected.

16. An antenna module comprising:
a touch panel that detects an object that has been brought into contact or proximity;
a plurality of near field communication antennas arranged superposing the touch panel; and
a control unit that controls the plurality of near field communication antennas,
wherein the control unit starts driving a drive target antenna which is one or more near field communication antennas that correspond to a contact position or proximity position of the object detected by the touch panel, from among the plurality of near field communication antennas,
wherein the control unit sequentially drives the plurality of near field communication antennas in a prescribed order, and, in a case where contact or proximity has been detected by the touch panel, starts driving, as the drive target antenna, the one or more near field communication antennas that correspond to the contact position or proximity position, and
wherein, after communication processing carried out by the drive target antenna has ended, the control unit sequentially drives antennas excluding an antenna serving as the drive target antenna, from among the plurality of near field communication antennas.

* * * * *